(12) United States Patent
Jung

(10) Patent No.: US 7,659,835 B2
(45) Date of Patent: Feb. 9, 2010

(54) METHOD AND APPARATUS FOR RECOGNIZING PARKING SLOT BY USING BIRD'S EYE VIEW AND PARKING ASSIST SYSTEM USING THE SAME

(75) Inventor: Hogi Jung, Seoul (KR)

(73) Assignee: Mando Corporation, Pyeongtaek-si (KR)

( * ) Notice: Subject to any disclaimer, the term of this patent is extended or adjusted under 35 U.S.C. 154(b) by 257 days.

(21) Appl. No.: 11/901,001

(22) Filed: Sep. 14, 2007

(65) Prior Publication Data

US 2008/0136673 A1 Jun. 12, 2008

(30) Foreign Application Priority Data

Sep. 14, 2006 (KR) .................. 10-2006-0089335

(51) Int. Cl.
*B60Q 1/48* (2006.01)
(52) U.S. Cl. ................. 340/932.2; 340/995.1; 382/276; 382/287; 382/295; 348/143

(58) Field of Classification Search .............. 340/932.2, 340/995.1, 995.24, 995.12, 995.17; 382/104, 382/154, 276, 287, 295; 384/143, 144, 148, 384/293, 295, 294
See application file for complete search history.

(56) References Cited

U.S. PATENT DOCUMENTS

| 6,947,611 | B2 * | 9/2005 | Kawakami et al. .......... 382/293 |
| 7,317,813 | B2 * | 1/2008 | Yanagawa et al. ........... 382/104 |
| 2003/0165255 | A1 | 9/2003 | Yanagawa et al. |
| 2004/0105579 | A1 | 6/2004 | Ishii et al. |

FOREIGN PATENT DOCUMENTS

DE 10045616 A1 3/2002

* cited by examiner

*Primary Examiner*—Toan N Pham
(74) *Attorney, Agent, or Firm*—Lahive & Cockfield, LLP; EuiHoon Lee, Esq.

(57) ABSTRACT

Disclosed are a method and an apparatus for recognizing a parking slot by using a bird's-eye view and a parking assist system using the same.

12 Claims, 22 Drawing Sheets

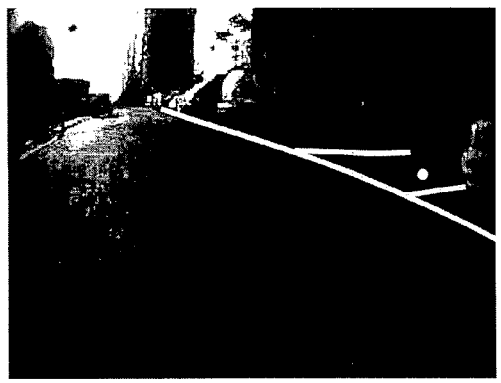
*Fig. 28a*  *Fig. 28b*
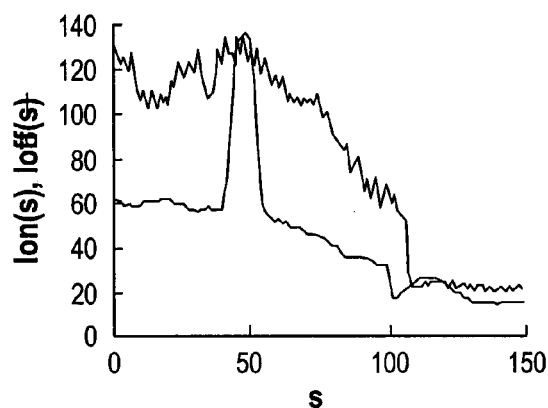
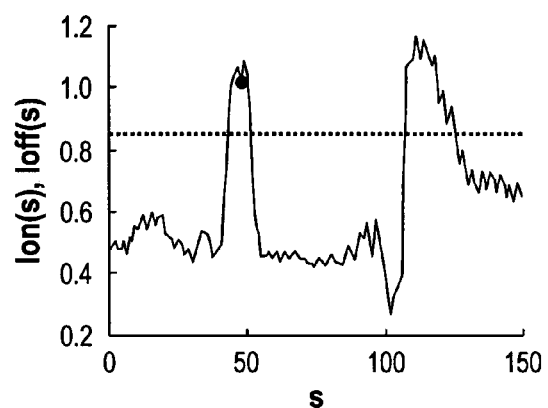
*Fig. 28c*  *Fig. 28d*

METHOD AND APPARATUS FOR RECOGNIZING PARKING SLOT BY USING BIRD'S EYE VIEW AND PARKING ASSIST SYSTEM USING THE SAME

CROSS-REFERENCE TO RELATED APPLICATION

This non-provisional application claims priority under 35 U.S.C §119(a) on Patent Application No. 10-2006-89335 filed in Korea on Sep. 14, 2006, the entire contents of which are hereby incorporated by reference.

FIELD OF THE INVENTION

The present invention relates to a method and an apparatus for recognizing a parking slot by using a bird's-eye view and a parking assist system using the same. More particularly, the present invention relates to a method and an apparatus for recognizing a parking slot by using a bird's-eye view and a parking assist system using the same, wherein a parking slot is accurately recognized on a computer vision basis.

BACKGROUND OF THE INVENTION

As generally known in the art, semi-automatic parking systems improve drivers' convenience by automating steering operations necessary to park vehicles. In line with drivers' increasing interest in parking assist systems, major car and component manufacturers are developing various types of parking assist systems.

When such a parking assist system is used to park a vehicle, it is inevitable to select a target parking location, i.e. where the driver wants the vehicle to be parked. Therefore, much study is being made to develop better methods for selecting such a target parking location.

Methods for selecting the target parking location include those using a razer scanner to recognize a vacant parking space, those using a network of an SRR (Short Range Radar), those using computer vision, those using a GPS (Global Positioning System) and a digital map, those relying on the driver's manual designation, etc.

A Prius IPAS (Intelligent Parking Assist System) has been developed by Toyota and Aisin Seiki in 2003 as a semi-automatic parking assist system in which drivers manually designate the target parking location.

Methods using computer vision are recently drawing much attention, because they can show drivers images regarding how vehicles are parked. These types of methods are classified into those for recognizing nearby vehicles, those for recognizing parking slot markings, and those for recognizing both nearby vehicles and parking slot markings. Nico Kaempchen has developed a method for recognizing a vacant parking space by identifying nearby vehicles on a stereo vision basis. Jin Xu has developed technology for recognizing parking slot markings based on monocular vision that relies on neural networks.

Another system has recently been developed to recognize parking slot markings based on stereo vision while considering nearby vehicles. Aisin Seiki is also developing technology for stereoscopically recognizing nearby vehicles by using motion stereo and for providing drivers with images from an easy-to-understand viewpoint based on IVR (Intermediate View Reconstruction) through the parking process. Although these technologies aim at recognizing a parking location more accurately and quickly, they have drawbacks as well as advantages.

Therefore, it is requested to develop parking slot recognition technology for recognizing a target parking location more accurately and quickly solely based on drivers' simple operations.

SUMMARY OF THE INVENTION

Accordingly, the present invention has been made to solve the above-mentioned problems occurring in the prior art, and the present invention provides a method and an apparatus for recognizing a parking slot by using a bird's-eye view and a parking assist system using the same, wherein a parking slot is accurately recognized on a computer vision basis by receiving an input of a seed point from the driver, recognizing marking line segments by using the directional intensity gradient on a line segment extending from a camera to the seed point, estimating the direction of the marking line segments based on characteristics of the directional intensity gradient, refining the direction of the marking line segments based on edge following, regarding a marking line segment, which is closer to the camera, as a guideline among marking line segments intersecting with the direction of view from the camera to the seed point, and recognizing separating line segments in the direction of the guideline.

In accordance with an aspect of the present invention, there is provided an apparatus for recognizing a parking slot by using a bird's-eye view, the apparatus including a camera for photographing a parking space at a vehicle and creating and transferring an input image; a user interface unit for receiving an input of a seed point as a desired parking location in the parking space from a driver and transferring the seed point; and a parking slot recognition unit for receiving the input image from the camera and the seed point from the user interface unit, converting the input image into a bird's-eye view, estimating a number of marking line segments and a direction of the marking line segments by using a directional intensity gradient regarding a distance on the bird's-eye view, recognizing a marking line segment closer to the camera as a guideline among at least one marking line segment intersecting with a direction of view from the camera to the seed point, and recognizing a number of separating line segments in a direction of the guideline so as to recognize the guideline and the separating line segments as the parking slot.

In accordance with another aspect of the present invention, there is provided a method for recognizing a parking slot based on a bird's-eye view by a parking slot recognition unit connected to a camera and a user interface unit to recognize a parking slot, the camera photographing a parking space at a vehicle and creating and transferring an input image, the user interface unit receiving an input of a seed point from a driver as a desired parking location in the parking space and transferring the seed point, the method including the steps of (a) receiving the input image and the seed point and converting the input image into a bird's-eye view; (b) estimating a number of marking line segments and a direction of the marking line segments by using a directional intensity gradient regarding a distance on the bird's-eye view; (c) recognizing a marking line segment closer to the camera as a guideline among at least one marking line segment intersecting with a direction of view from the camera to the seed point; and (d) recognizing a number of separating line segments in a direction of the guideline so as to recognize the guideline and the separating line segments as the parking slot.

In accordance with another aspect of the present invention, there is provided a system for assisting parking of a vehicle by recognizing a parking slot based on a bird's-eye view, the system including a parking slot recognition unit having a camera and a user interface unit, the parking slot recognition unit receiving an input image from the camera and a seed point from the user interface unit, converting the input image into a bird's-eye view, estimating a number of marking line segments and a direction of the marking line segments by using a directional intensity gradient regarding a distance on the bird's-eye view, recognizing a marking line segment closer to the camera as a guideline among at least one marking line segment intersecting with a direction of view from the camera to the seed point, recognizing a number of separating line segments in a direction of the guideline so as to recognize the guideline and the separating line segments as the parking slot, and transferring a target parking slot; a detection unit having a number of sensors for recognizing a driving condition of the vehicle, the detection unit creating and transferring information regarding the driving condition of the vehicle; a parking assist control unit for estimating a location of the vehicle based on the information regarding the driving condition from the detection unit, receiving the target parking slot so as to create a path plan for parking the vehicle at the parking slot, and creating and transferring a control signal for parking the vehicle at the parking slot based on consideration of the location; and an active steering unit for steering the vehicle according to the control signal after receiving the control signal.

BRIEF DESCRIPTION OF THE DRAWINGS

The above and other objects, features, and advantages of the present invention will be more apparent from the following detailed description taken in conjunction with the accompanying drawings, in which:

FIG. 28 shows an exemplary process for recognizing a parking slot when the intensity varies greatly among parts of an image.

DETAILED DESCRIPTION OF THE EXEMPLARY EMBODIMENTS

Figure 1:
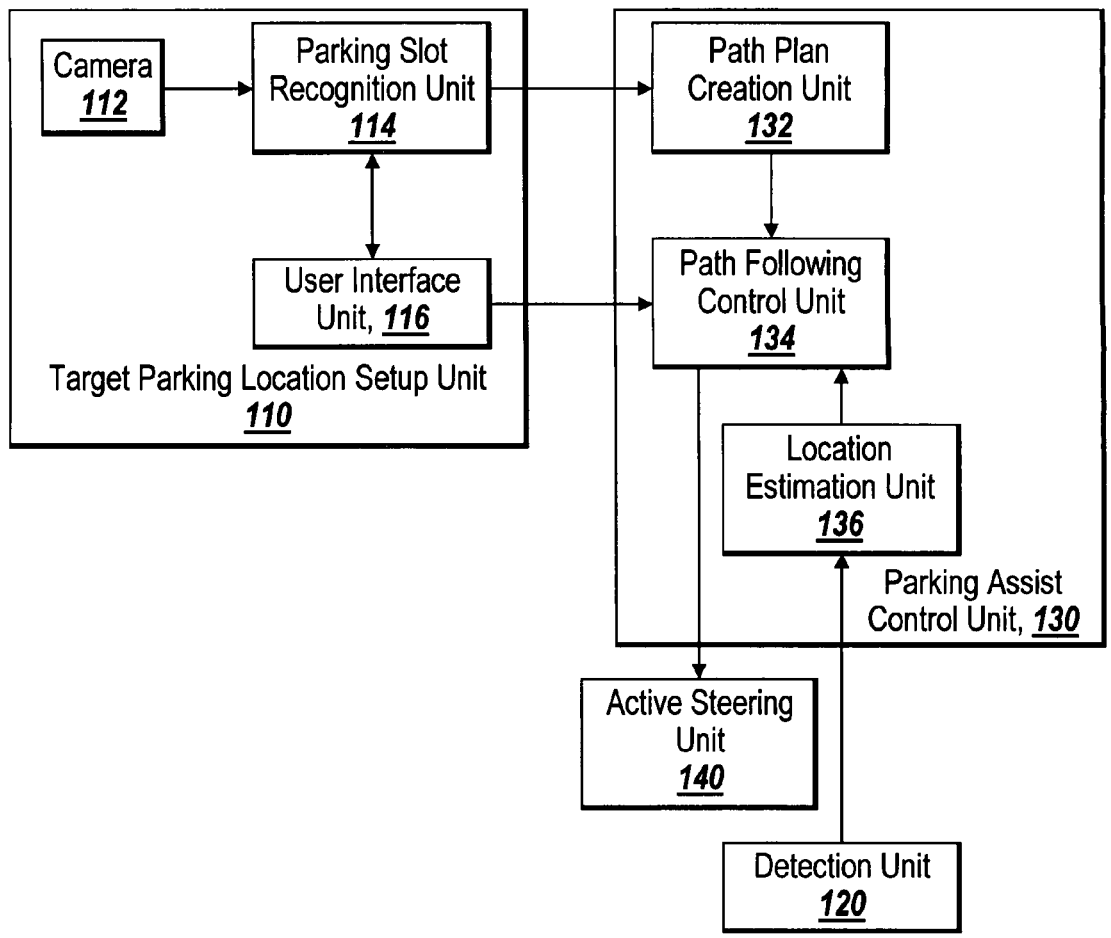
FIG. 1 is a block diagram showing the brief construction of a parking assist system using a bird's-eye view according to one embodiment of the present invention.

Hereinafter, an exemplary embodiment of the present invention will be described with reference to the accompanying drawings. In the following description and drawings, the same reference numerals are used to designate the same or similar components, and so repetition of the description on the same or similar components will be omitted.

FIG. 1 is a block diagram showing the brief construction of a parking assist system using a bird's-eye view according to one embodiment of the present invention.

The parking assist system 100 using a bird's-eye view according to one embodiment of the present invention includes a target parking location setup unit 110, a detection unit 120, a parking assist control unit 130, and an active steering unit 140.

The target parking location setup unit 110 includes a camera 112, a parking slot recognition unit 114, and a user interface unit 116. The target parking location setup unit 110 recognizes a parking slot, sets up a target parking slot (i.e. where the driver wants the vehicle parked), and transfers it based on an input image of a parking space taken by the camera 112 and a seed point designated by the driver as a target parking location by using the user interface unit 116.

The camera 112 according to one embodiment of the present invention is adapted to photograph a parking space, create an input image, and transfer it.

The parking slot recognition unit 114 according to one embodiment of the present invention is adapted to receive an input image from the camera 112 and an input of a seed point from the user interface unit 116. Then, the parking slot recognition unit 114 converts the input image into a bird's-eye view and measures a directional intensity gradient regarding distance on the bird's-eye view so as to estimate a number of marking line segments and their directions. From the marking line segments, the parking slot recognition unit 114 selects at least one intersecting with the direction of view from the camera 112 to the seed point, and regards one of the selected marking line segments, which is closer to the camera 112, as a guideline. The parking slot recognition unit 114 recognizes a number of separating line segments in the direction of the guideline and identifies a parking slot delimited by the guideline and the separating line segments. The parking slot recognition unit 114 creates and sets up a target parking slot, and transmits it to the parking assist control unit 130. If necessary, the parking slot recognition unit 114 creates an output image from the result of recognizing a parking slot and transmits it to the user interface unit 116.

To this end, the parking slot recognition unit 114 according to one embodiment of the present invention includes a memory for storing software and data related to an algorithm for recognizing a parking slot, a microprocessor for executing the program stored in the memory and recognizing a parking slot, etc.

The user interface unit 116 according to one embodiment of the present invention is adapted to receive an input image and display it on the screen. Upon receiving an input of a seed point from the driver, the user interface unit 116 transmits the seed point to the parking slot recognition unit 114. Upon receiving an output image, the user interface unit 116 displays it on the screen. To this end, the user interface unit 116 according to one embodiment of the present invention includes an LCD, a touch pad, a keyboard, etc.

The detection unit 120 has a number of sensors, particularly a wheel speed sensor, a steering angle sensor, a yaw rate sensor, and an acceleration sensor, so as to detect the vehicle driving condition and transmit a corresponding electric signal, i.e. a detection signal, to a location estimation unit 138 of the parking assist control unit 130.

The parking assist control unit 130 includes a path plan creation unit 132, a path following control unit 134, and a location estimation unit 136. The parking assist control unit 130 establishes a parking path plan based on a target parking slot transmitted from the target parking slot setup unit 110. The parking assist control unit 130 follows the established parking path plan while considering the vehicle location and driving condition, creates a control signal necessary to parking the vehicle at the target parking slot, and transmits the control signal to the active steering unit 140.

The active steering unit 140 is a type of steering assist device using various sensors and control devices to guide the steering operation based on the driver's steering input while guaranteeing steering stability. The active steering unit 140 controls the vehicle based on a control signal from the parking assist control unit 130.

The detection unit 120, the parking assist control unit 130, and the active steering unit 140 have the same or similar roles and functions as in the case of a conventional automatic or semi-automatic parking system, and detailed description thereof will be omitted herein.

Figure 2:
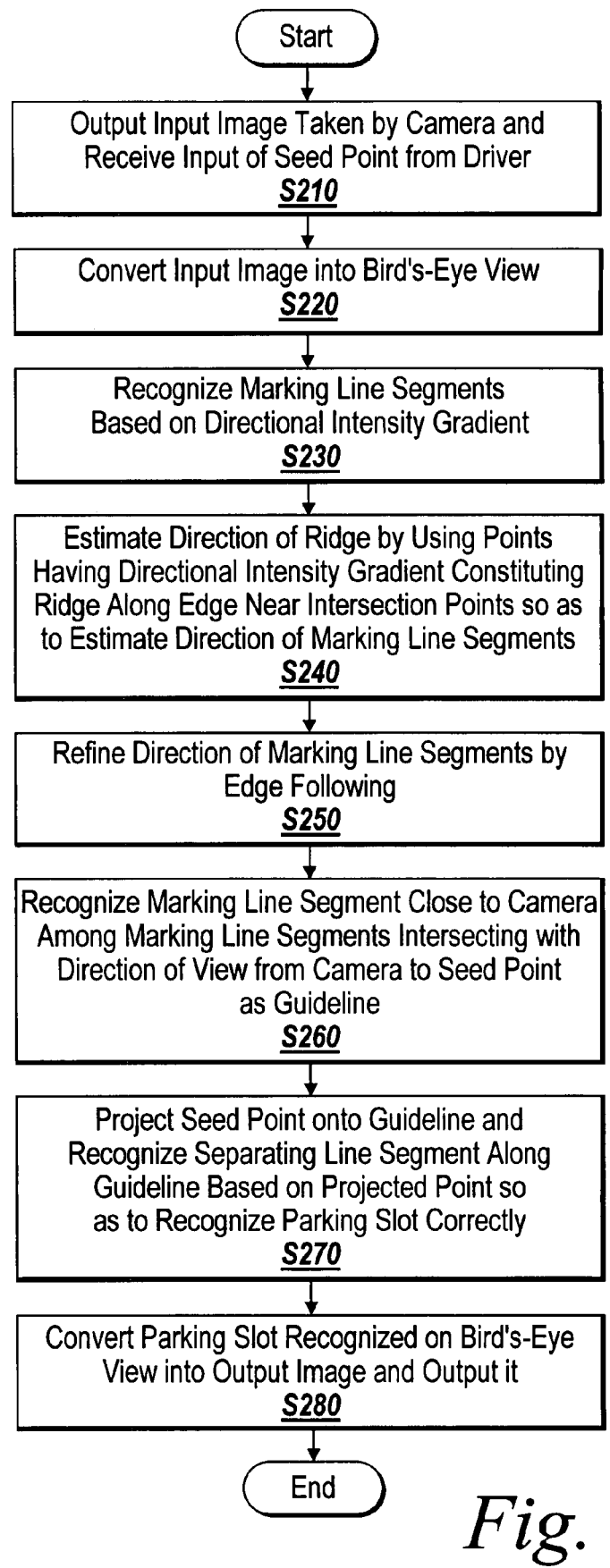
FIG. 2 is a flowchart showing a method for recognizing a parking slot by using a bird's-eye view according to one embodiment of the present invention.

FIG. 2 is a flowchart showing a method for recognizing a parking slot by using a bird's-eye view according to one embodiment of the present invention.

The camera 112 photographs a parking space, creates an input image, and transmits it to the parking slot recognition unit 114, which then forwards the input image to the user interface unit 116, which then receives an input of a seed point from the driver and transmits it to the parking slot recognition unit 114 (S210).

The parking slot recognition unit 114 converts the input image into a bird's-eye view (S220). The parking slot recognition unit 114 measures the directional intensity gradient on a line segment extending from the seed point to the camera on the bird's-eye view, and detects a point having a positive peak, at which the directional intensity gradient has a value above a predetermined threshold. Then, the parking slot recognition unit 114 recognizes points, which are spaced from the seed point as much as the point having a positive peak, as a number of marking line segments (S230). The threshold may be obtained by subtracting an average value from a maximum value of intensity on a line segment joining the seed point and the camera and then dividing the difference by an integer (e.g. 3).

After recognizing a number of marking line segments, the parking slot recognition unit 114 measures the directional intensity gradient near intersection points between the line segment joining the seed point and the camera and the marking line segments. The parking slot recognition unit 114 estimates the direction of a ridge composed of the value of directional intensity gradient near the intersection points, and regards the estimated ridge direction as the direction of the marking line segments (S240).

After estimating the direction of marking line segments, the parking slot recognition unit 114 refers to the intersection points between the line segment joining the seed point and the camera and the marking line segments, as well as their direction, so as to select nothing but marking line segments lying in the direction of the marking line segments and to conduct edge following. As such, the parking slot recognition unit 114 re-estimates the direction of the marking line segments and refines it (S250).

After refining the direction of marking line segments, the parking slot recognition unit 114 recognizes a marking line segment, which is closest to the camera 112, as a guideline among the marking line segments intersecting with the direction of view from the camera 112 to the seed point (S260).

After recognizing a guideline, the parking slot recognition unit 114 projects the seed point onto the guide line and searches in both directions of a unit vector extending along the guideline from the projected point (i.e. T-shaped template matching) so as to recognize a number of separating marking line segments (S270).

After recognizing separating marking line segments, the parking slot recognition unit 114 recognizes a parking slot delimited by the guideline and the separating marking line segments, and transmits the target parking slot to the parking assist control unit 130. If necessary, the parking slot recognition unit 114 converts the bird's-eye view of the parking slot into an output image and transmits it to the user interface unit 116, which then outputs the image (S280).

A process for recognizing a parking slot by the target parking location setup unit 110, particularly the parking slot recognition unit 114, based on an input image according to one embodiment of the present invention will now be described in detail.

Figure 3:
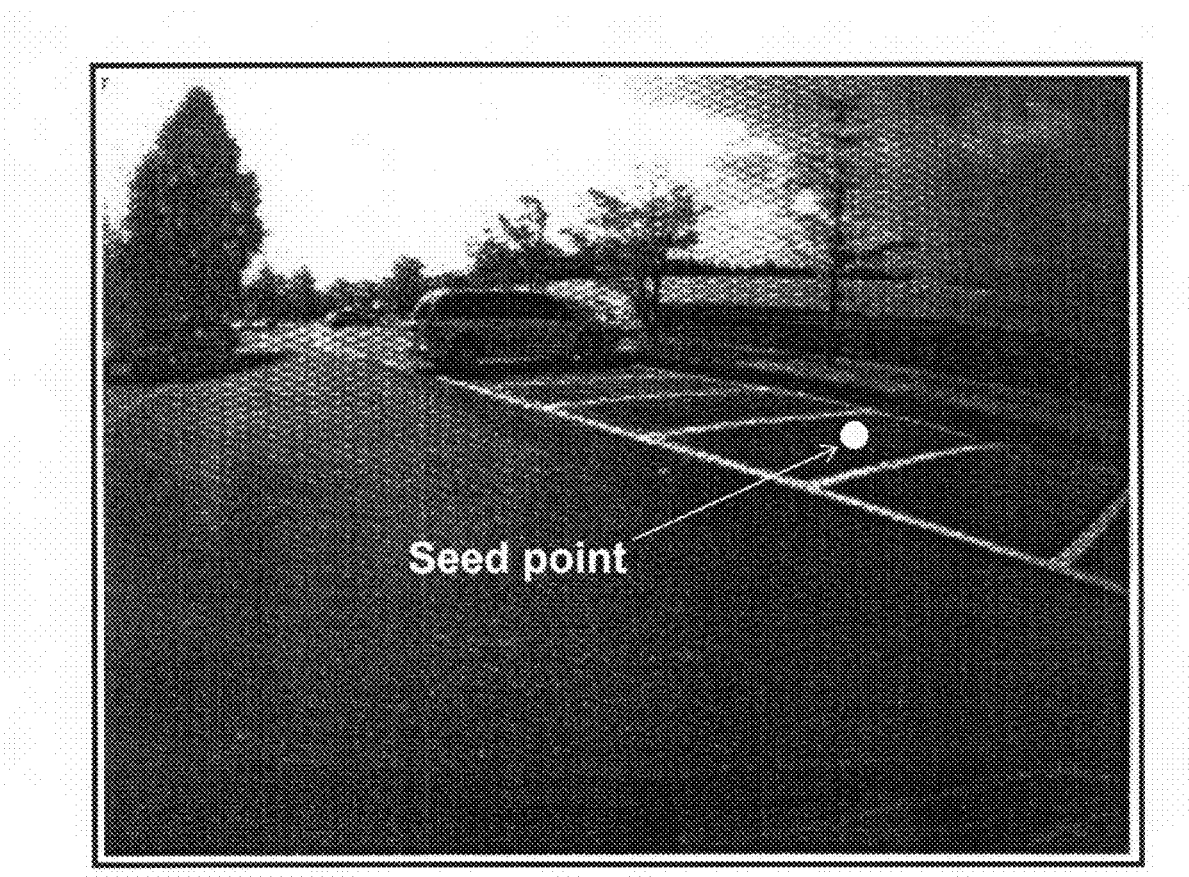
FIG. 3 shows an exemplary process for designating a seed point according to one embodiment of the present invention.

FIG. 3 shows an exemplary process for designating a seed point according to one embodiment of the present invention.

The present invention relates to technology for recognizing a parking slot by the parking slot recognition unit 114 based on a seed point, which is designated by the driver with the touch screen, for example, of the user interface unit 116 as a location in a parking space where the driver wants the vehicle parked. Particularly, the camera 112 photographs the parking space and creates an input image, which is outputted by the user interface unit 116 so that the driver inputs a seed point. This commences the parking slot recognition process. After a seed point is designated on the input image, it is converted into a bird's-eye view so that the parking slot is recognized.

1. Bird's-Eye View Construction

The input image undergoes fisheye distortion correction and is converted into a bird's-eye view by homography. A fisheye lens or a wide-angle lens is used as the camera in order to secure a wide FOV (Field of View) in the parking process.

FIG. 4 shows an exemplary bird's-eye view conversion process.

Figure 4A:
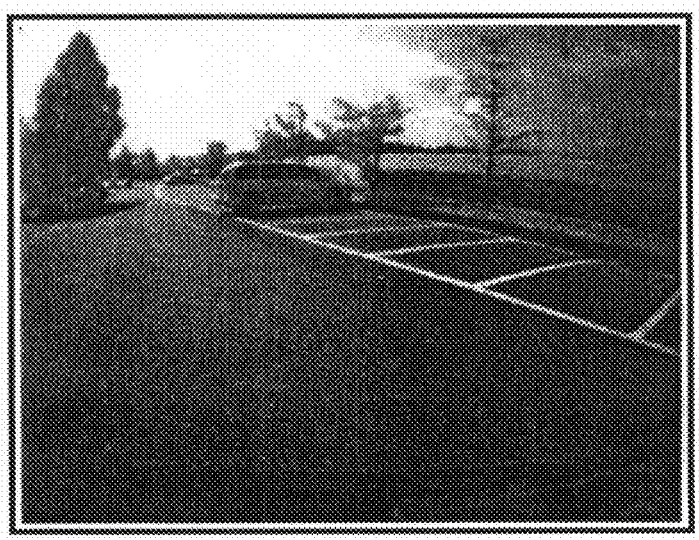
FIG. 4 shows an exemplary bird's-eye view conversion process.
Figure 4B:
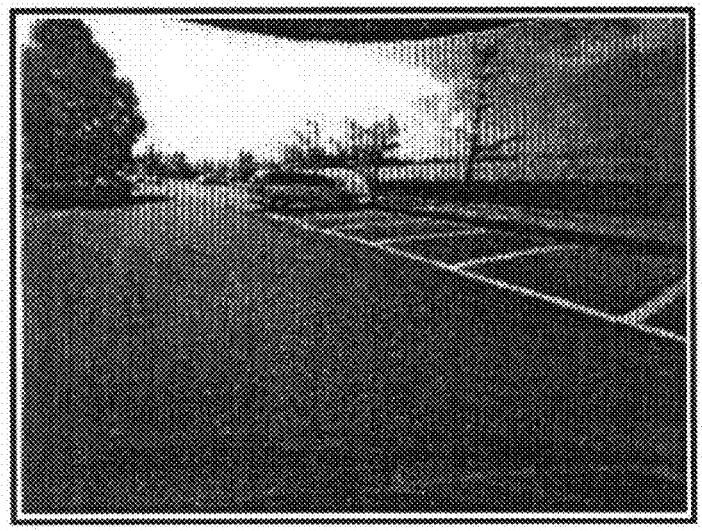
Figure 4C:
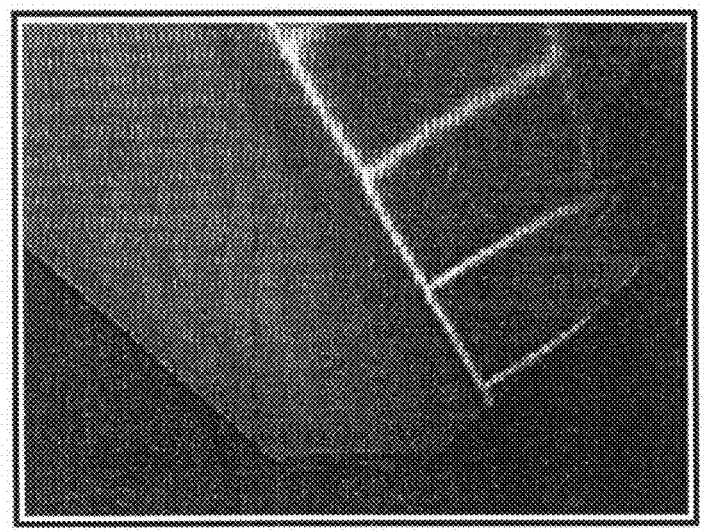

Particularly, FIG. 4A shows an input image created by photographing a parking space with the camera, FIG. 4B shows a distortion-corrected image, into which the input image has been converted, and FIG. 4C shows a bird's-eye view, into which the distortion-corrected image has been converted. As shown in FIG. 4A, the image inputted via the fisheye lens has a wide FOV, but contains severe distortion. Such distortion of the input image from the fisheye lens is mainly caused by radial distortion that is defined in terms of distance from the center of the image. The distortion by the fisheye lens is modeled into a fifth-order polynomial by using Caltech Calibration Toolbox, and the inverse mapping based on a distortion factor is also approximated into a fifth-order polynomial. As a result, a distortion-corrected image as shown in FIG. 4B is obtained.

In addition, the level and angle of the camera relative to the ground may be used in such a manner that each coordinate in the distorted image corresponds to one and only one coordinate in the bird's-eye view (i.e. homography). As used herein, the bird's-eye view refers to a view of objects from above on an assumption that all objects in the view lie on the ground. While a conventional pinhole camera model includes perspective distortion, the size of which varies depending on the distance, the perspective distortion is removed from the bird's-eye view with regard to objects on the ground, so that the bird's-eye view is suitable for recognizing objects on the ground. The distortion-corrected image shown in FIG. 4B is converted by homography into the bird's-eye view shown in FIG. 4C. It is assumed therefore that every following image processing according to the present invention is conducted on the bird's-eye view.

2. Guideline Recognition

A parking slot consists of a guideline and separating line segments. Recognition of a parking slot is based on recognition of a parking slot marking line segment that separates the parking slot from the road. As such, the parking slot marking line segment is the basis for subsequent recognition processes, and is referred to as a guideline.

Figure 5:
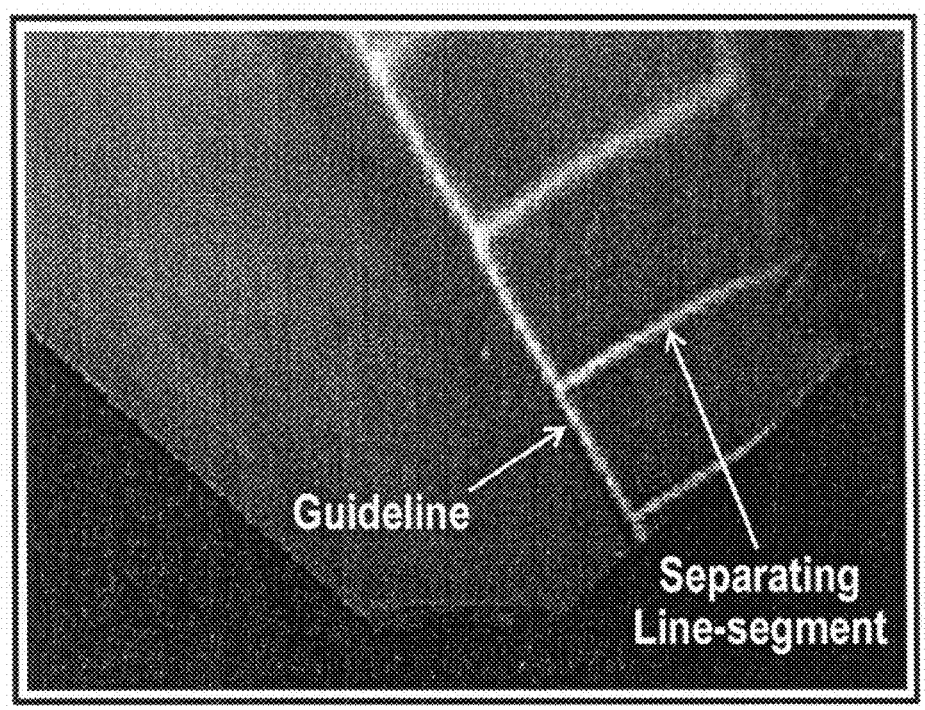
FIG. 5 shows an exemplary guideline and separating line segments on a bird's-eye view.

FIG. 5 shows an exemplary guideline and separating line segments on a bird's-eye view.

Each parking slot is delimited by line segments perpendicular to the guideline, i.e. separating line segments, as shown in FIG. 5.

3.1 Recognition of Parking Slot Marking Line Segment Based on Directional Intensity Gradient Parking slot marking line segments are recognized from line segments joining the seed point, which has been designated by the driver, and the camera based on the directional intensity gradient.

Figure 6:
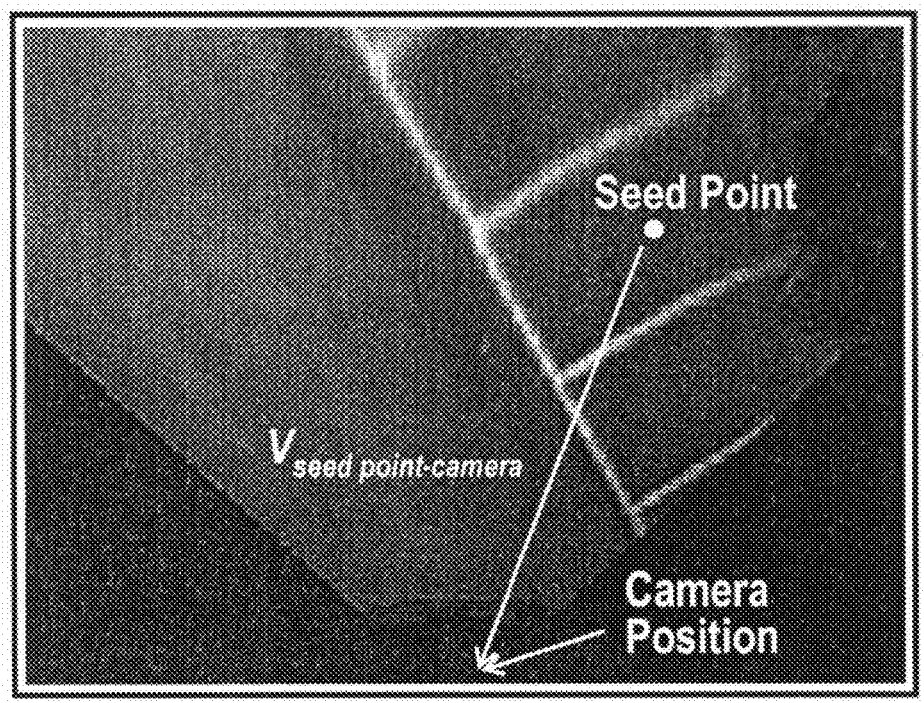
FIG. 6 shows an exemplary vector extending from a seed point to a camera on a bird's-eye view.

FIG. 6 shows an exemplary vector extending from a seed point to a camera on a bird's-eye view.

It is assumed with reference to FIG. 6 that a vector $v_{seed point-camera}$ extends from the seed point to the camera and that the corresponding unit vector is $u_{seed point-camera}$. It then can be said that the vector shown in FIG. 6 is a representation of the intensity of pixels on the line segment extending from the seed point to the camera with regard to unit length s. Now that starting point $p_s$ and vector u have been determined, the intensity of a point spaced from $p_s$ by s in the direction of u is $I(p_{Bs}+s \cdot u)$, or simply $I(s)$.

Figure 7:
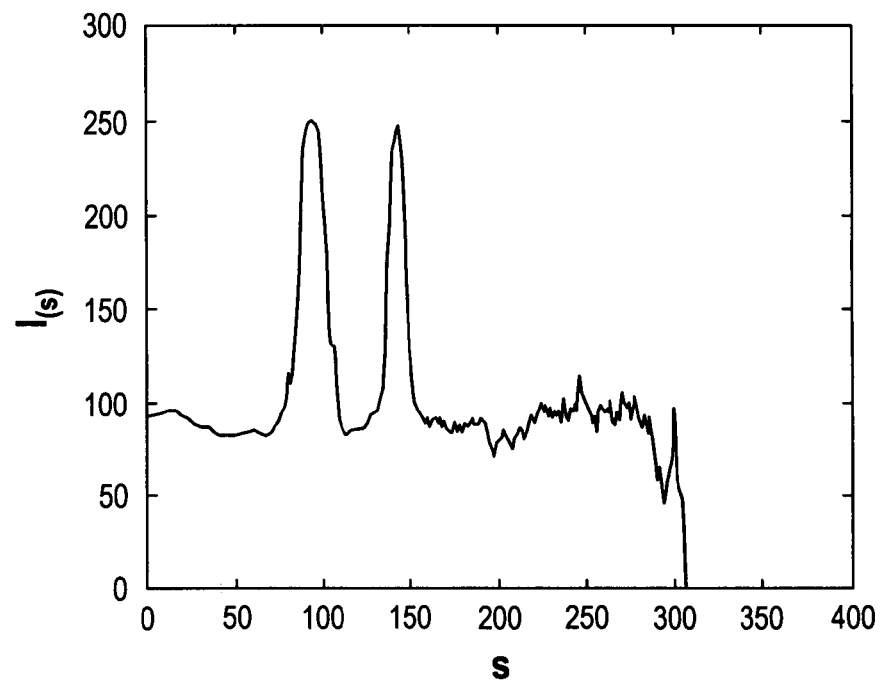
FIG. 7 shows exemplary intensity between a seed point and a camera.

FIG. 7 shows exemplary intensity between the seed point and the camera.

It is clear from FIG. 7 that, as the vector $v_{seed point-camera}$ extending from the seed point to the camera intersects with two marking line segments on the bird's-eye view, two peaks having a distance corresponding to the width of the marking line segments occur.

$$dI(p, u) = \frac{1}{w} \sum_{i=1}^{\frac{w}{2}} I(p - i \cdot u) - \frac{1}{w} \sum_{i=1}^{\frac{w}{2}} I(p + i \cdot u) \quad (1)$$

Equation (1) defines the directional intensity gradient $dI(p, u)$ regarding vector u of an arbitrary point $p(x,y)$. The directional intensity gradient regarding vector u of a point spaced from the start point $p_s$ in the direction of vector u as much as the length of pixel s is calculated as $dI(p_s+s \cdot u, u)$, which can be simplified as $dI(s)$ if $p_s$ and u have been determined.

If the camera maintains fixed level and angle relative to the ground, marking line segments on the ground would have a substantially constant width W on the bird's-eye view. Therefore, the present invention defines the directional intensity gradient in such a manner that average intensity corresponding to a length of W/2 is employed. This guarantees that edges are stably detected without being affected by noise.

Figure 8:
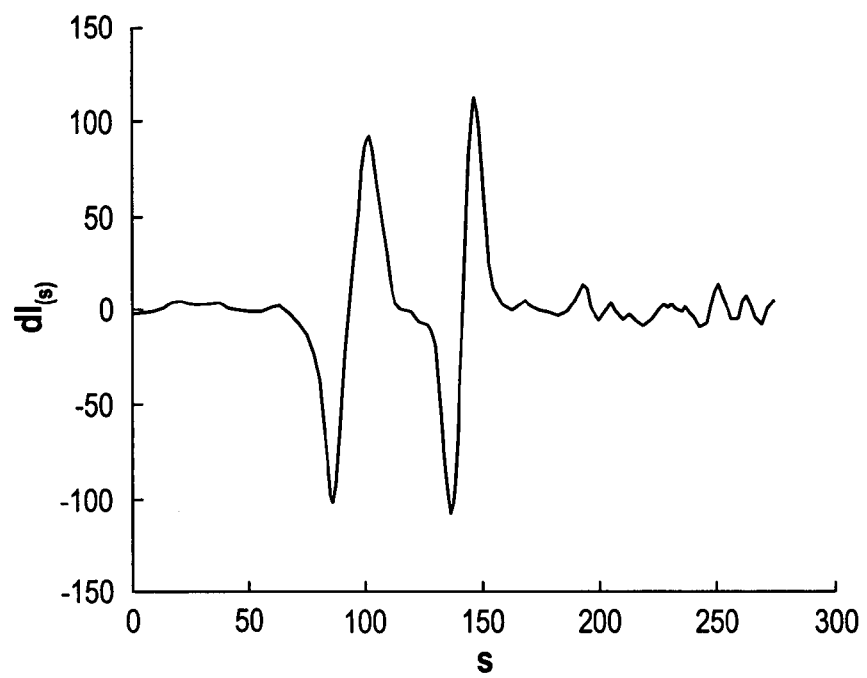
FIG. 8 shows an exemplary intensity gradient between a seed point and a camera.

FIG. 8 shows an exemplary intensity gradient between the seed point and the camera.

Particularly, FIG. 8 shows the result of obtaining a directional intensity gradient $dI(s)$ in the direction of $u_{seed point-camera}$ from seed point $p_{seed point}$. It is clear from FIG. 8 that an edge of a marking line segment near the camera appears as a positive peak, and an edge far from the camera appears as a negative peak. Considering that the edge of the marking line segment near the camera can be easily followed, the positive peak is recognized as the location of the marking line segment. The threshold $\theta_{positive\ peak}$ for recognizing the positive peak is determined based on the maximum and average values of intensity of the line segment extending from the seed point to the camera, as defined by equation (2) below. If the threshold is determined adaptively, marking line segments can be detected regardless of the lighting condition.

$$\theta_{positive\ peak} = \frac{1}{3}\left(\max_s I(s) - \operatorname*{avg}_s I(s)\right) \quad (2)$$

Figure 9:
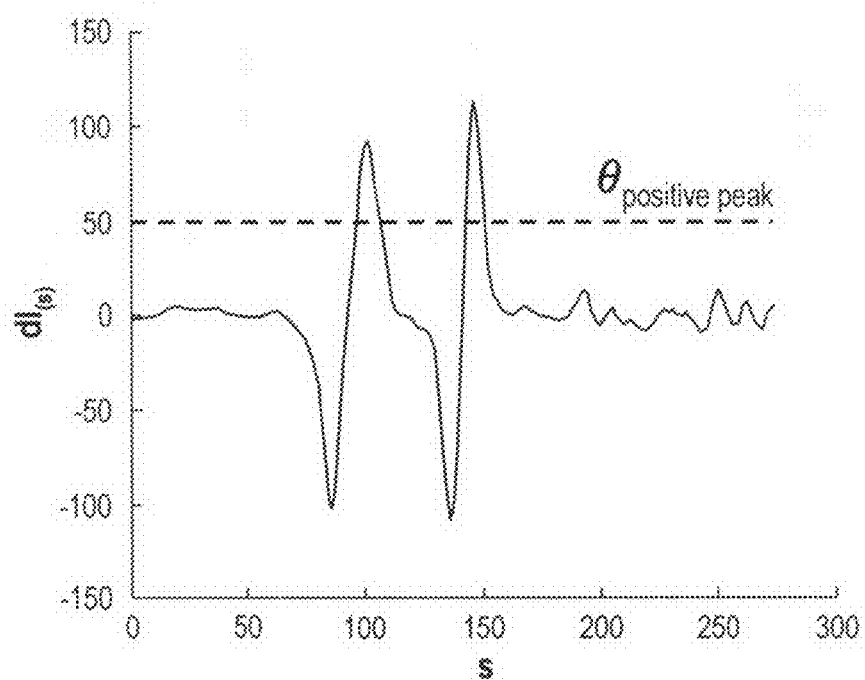
FIG. 9 shows an exemplary threshold and recognized positive peaks.

FIG. 9 shows an exemplary threshold and recognized positive peaks.

Particularly, FIG. 9 shows positive peaks recognized based on a threshold determined in the above-mentioned manner.

Figure 10:
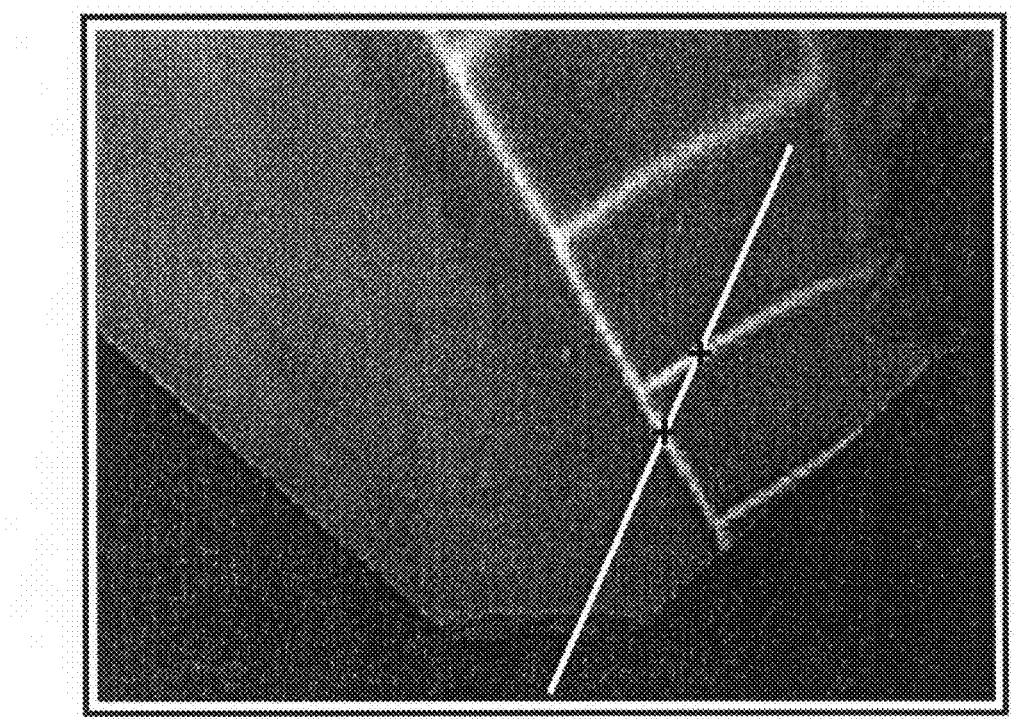
FIG. 10 shows exemplary locations corresponding to recognized positive peaks on a bird's-eye view.

FIG. 10 shows exemplary locations corresponding to recognized positive peaks on a bird's-eye view.

Particularly, FIG. 10 shows the location of positive peaks, which have been recognized as shown in FIG. 9, on a bird's-eye view. If any marking line segment on the bird's-eye view shown in FIG. 10 is confirmed to have been erroneously detected, it is removed through the edge following process described later.

3.2 Estimation of Direction of Marking Line Segment

A detected marking line segment has information regarding only its point of intersection with the line extending from the seed point to the camera. Based on the fact that the directional intensity gradient near the intersection point constitutes a ridge along an edge, the direction of the ridge and, therefore, that of the edge is estimated.

The directional intensity gradient of a point, which has a displacement $(dx,dy)$ relative to a center point $p_c(x_c,y_c)$, in the direction of u is calculated as $dI(p_c+(dx,dy),u)$, which is simplified as dI(dx,dy) if $p_c$ and u have been determined. The directional intensity gradient dI($p_{cross}$+(dx,dy), $u_{seed\ point-camera}$) regarding a window (W+1)×(W+1) about a detected intersection point $p_{cross}$ is obtained. In this case, dx and dy have a range of −W/2 to W/2. Use of a directional average, as in the case of detection of the intersection point, provides robustness against noise.

FIG. 11 shows exemplary intensity of a window near an intersection point together with a directional intensity gradient.

Figure 11A:
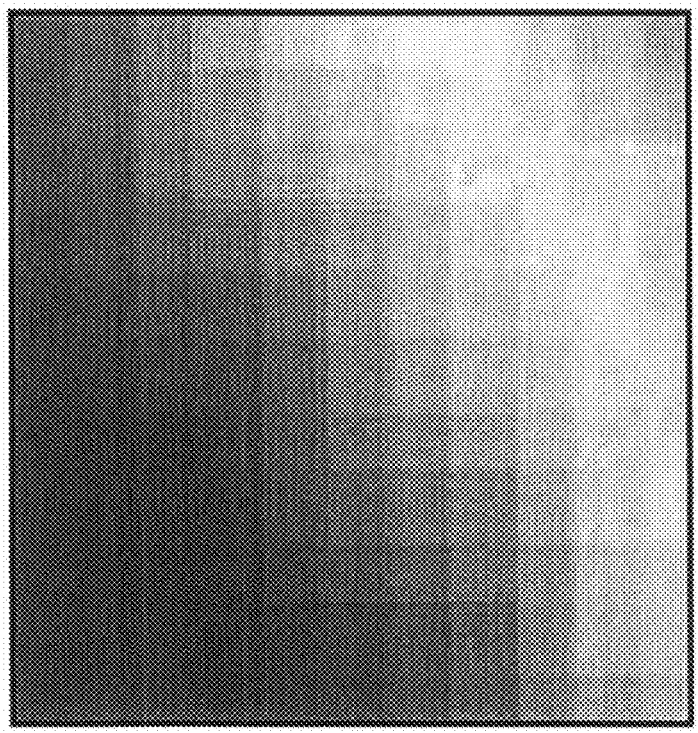
FIG. 11 shows exemplary intensity of a window near an intersection point together with a directional intensity gradient.
Figure 11B:
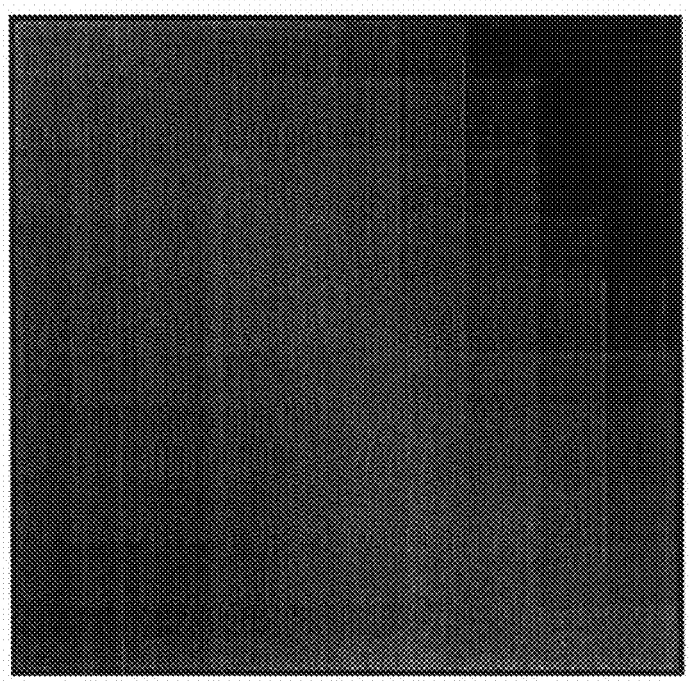

Particularly, FIG. 11A shows the intensity of a window near an intersection point, and FIG. 11B provides a gray-level view of directional intensity gradient near the intersection point.

Figure 12:
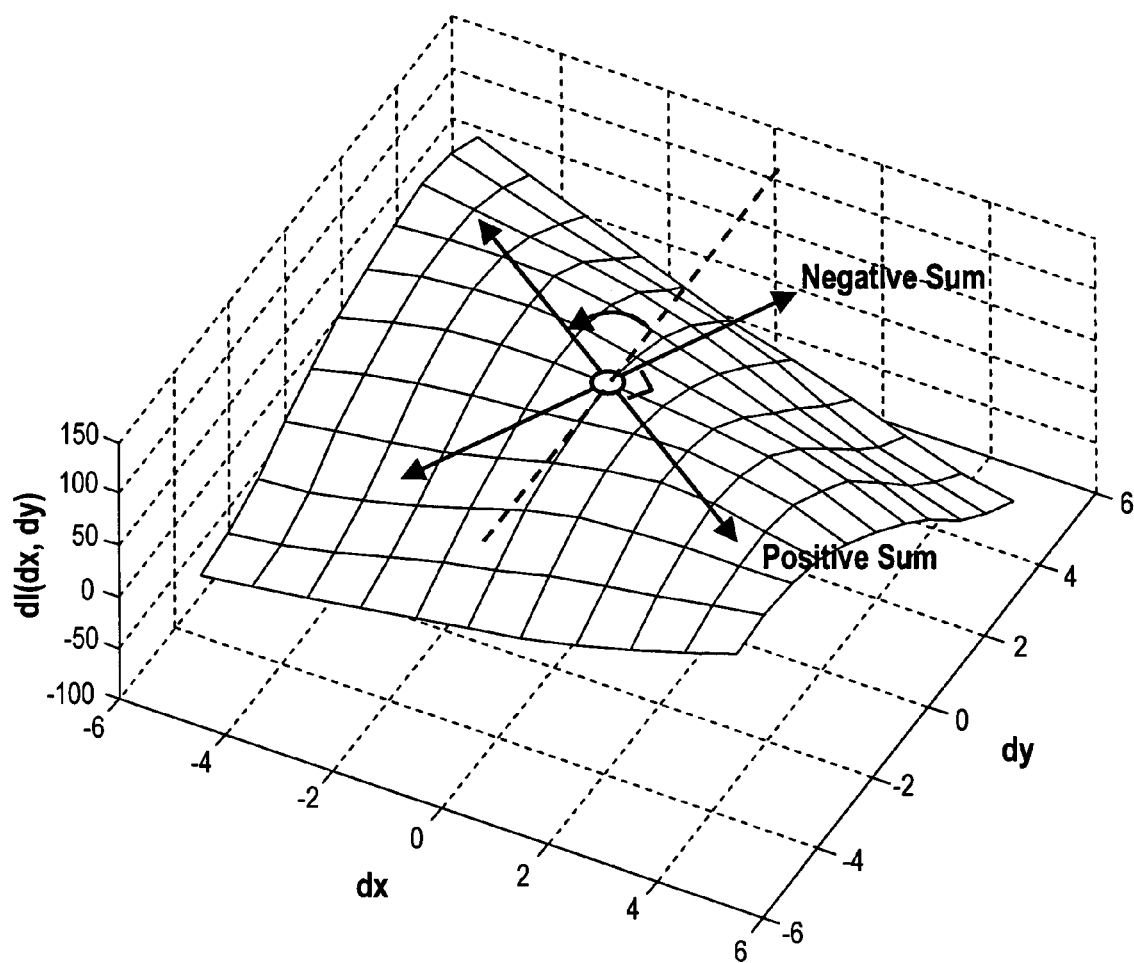
FIG. 12 shows an exemplary directional intensity gradient in a three-dimensional space.

FIG. 12 shows an exemplary directional intensity gradient in a three-dimensional space.

It is clear from the three-dimensional view of the directional intensity gradient dI(dx,dy) shown in FIG. 12 that dI(dx,dy) constitutes a ridge along the edge.

The measure fitness$_{ridge}$(φ) of coincidence between a line rotated by φ about the intersection point and the direction of the ridge is defined by equation (3) below. Then, the maximum value of φ indicates the direction of the ridge. Particularly, the measure proposed by the present invention is the difference between the sum of directional intensity gradient values on a line segment rotated by φ about the center of the window and the sum of directional intensity gradient values on a line segment perpendicular to the rotated line segment.

$$fitness_{ridge}(\phi) = \sum_{i=-\frac{w}{2}}^{\frac{w}{2}} dI(i \cdot \cos(\phi), i \cdot \sin(\phi)) - \sum_{i=-\frac{w}{2}}^{\frac{w}{2}} dI\left(i \cdot \cos\left(\phi + \frac{\pi}{2}\right), i \cdot \sin\left(\phi + \frac{\pi}{2}\right)\right) \quad (3)$$

Figure 13:
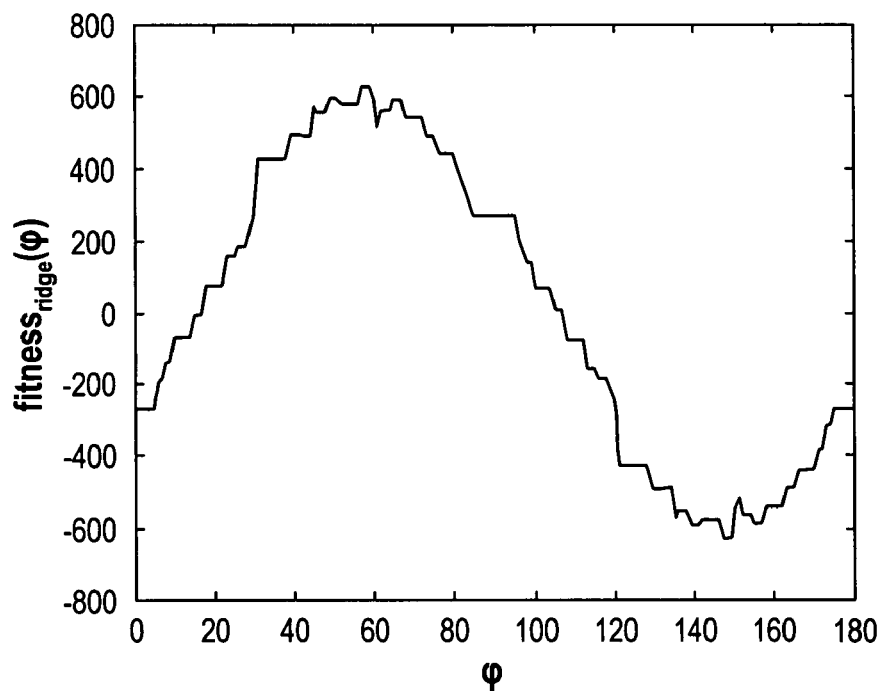
FIG. 13 shows an exemplary result of obtaining fitness$_{ridge}$ ($\phi$) in a range of 0-180°.

FIG. 13 shows an exemplary result of obtaining fitness$_{ridge}$(φ) in a range of 0-180°.

Particularly, FIG. 13 shows the result of obtaining fitness$_{ridge}$(φ) in a range of 0-180° with regard to the directional intensity gradient shown in FIG. 12.

The fitness$_{ridge}$(φ) shown in FIG. 13 can be approximated into a cosine function having a frequency $f_0$ of 1/180°. Although the direction of the ridge can be recognized as φ when fitness$_{ridge}$(φ) has the maximum value, it may use an estimated phase parameter for a cosine function, as defined by equation (4) below, in order to minimize the influence of noise.

$$fitness_{ridge}[n] = A \cdot \cos(2\pi f_0 n + \psi) + w[n]$$

where, n: integer index of φ, w[n]: white gausian noise (4)

The size and the phase parameter of a cosine function having a known frequency are estimated as defined by equation (5) below based on MLE (Maximum Likelihood Estimation).

$$\hat{A} = \frac{2}{180}\left|\sum_{n=0}^{179} fitness_{ridge}[n] \cdot e^{-j2\pi f_0 n}\right| \quad (5)$$

-continued $$\hat{\psi} = \tan^{-1}\left(\frac{-\sum_{n=0}^{179} fitness_{ridge}[n] \cdot \sin(2\pi f_0 n)}{\sum_{n=0}^{179} fitness_{ridge}[n] \cdot \cos(2\pi f_0 n)}\right)$$

Based on estimated parameters, if n gives the maximum value of fitness$_{ridge}$[n], the estimated ridge direction is recognized as φ, as defined by equation (6) below.

$$\phi_{ridge} = -\frac{\hat{\psi}}{2\pi f_0} \quad (6)$$

Figure 14:
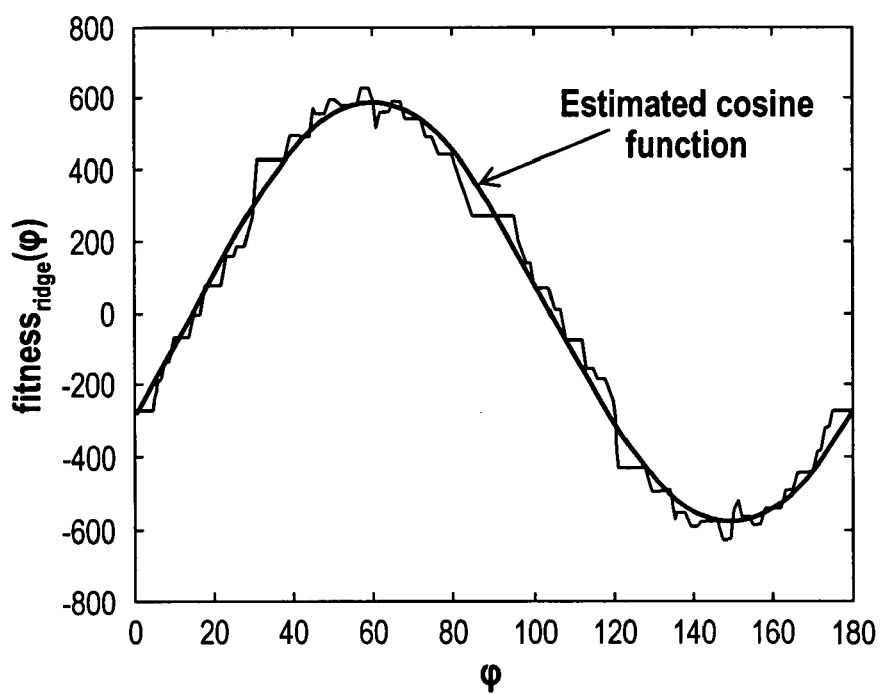
FIG. 14 shows an example of successful estimation of a parameter of a cosine function.

FIG. 14 shows an example of successful estimation of a parameter of a cosine function.

It is clear from FIG. 14 that a parameter of a cosine function has been successfully estimated.

Figure 15:
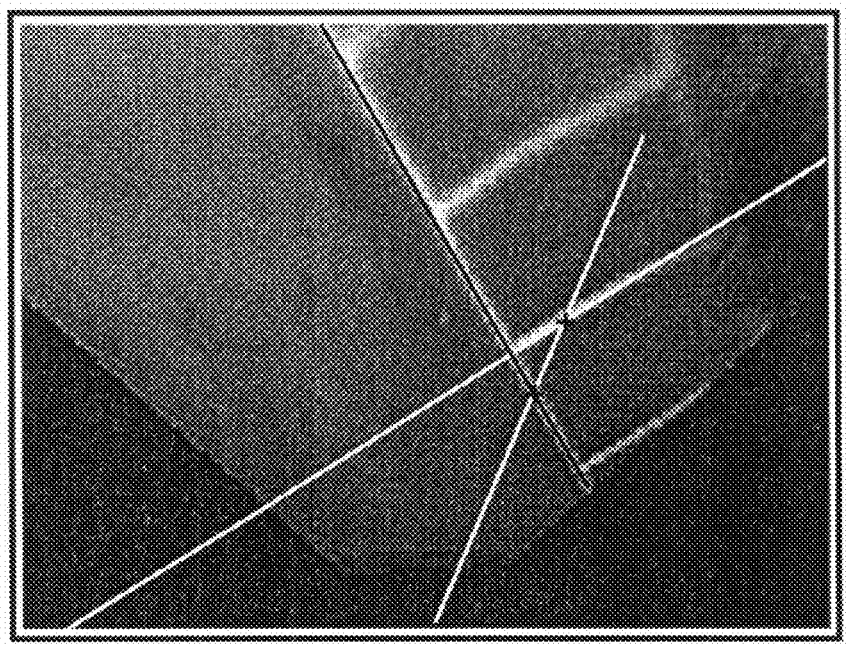
FIG. 15 shows an example of successful estimation of the direction of a marking line segment by using the direction of an estimated marking line segment.

FIG. 15 shows an example of successful estimation of the direction of a marking line segment by using the direction of an estimated marking line segment.

It is clear from FIG. 15 that the estimated direction estimation of the ridge based on estimation of the parameter of the cosine function substantially coincides with the direction of the camera-side edge of the marking line segment.

3.3. Refining Marking Line Segment Direction Based on Edge Following

Edge following is conducted based on the point of intersection between the line extending from the seed point to the camera and the marking line segment, as well as the initial edge direction, so as to refine the direction of the marking line segment and evaluate the reliability. Since the initial edge direction has been given, the directional intensity gradient defined by equation (1) can be used.

This makes it possible to follow edges while selectively considering edges in the direction of the marking line segment only. In addition, use of average intensity corresponding to a length of W/2 provides robustness against noise. The direction of the marking line segment is repeatedly updated with reference to a newly recognized edge while following the camera-side edge of the marking line segment.

Figure 16:
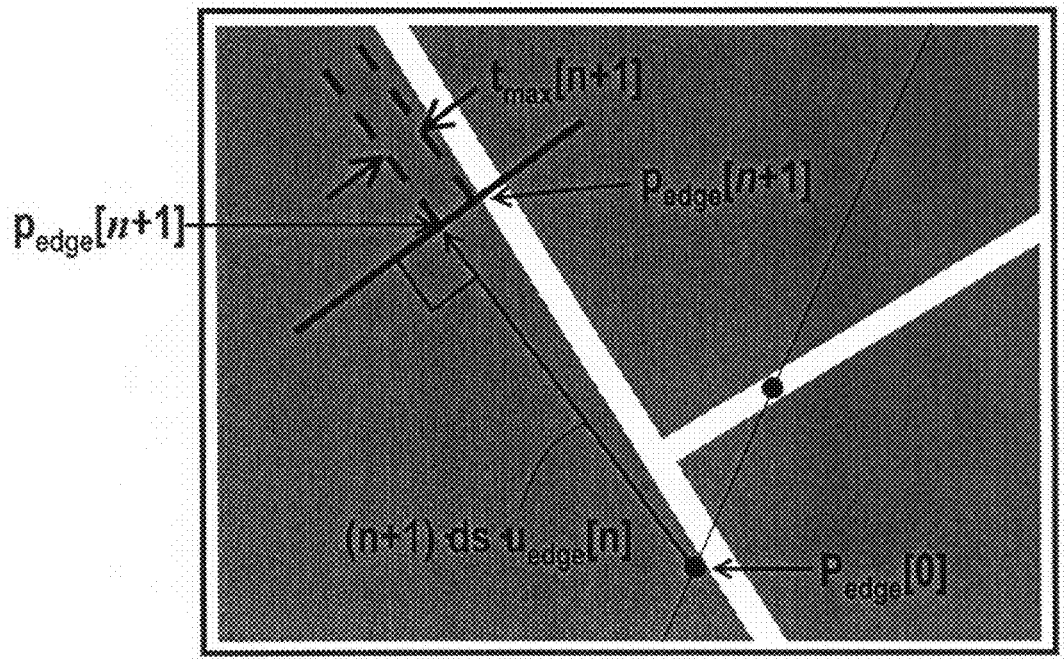
FIG. 16 shows an exemplary edge following process.

FIG. 16 shows an exemplary edge following process.

The estimated location of the (n+1)$^{th}$ edge, $P_{edge}$[n+1], is calculated in terms of intersection point $p_{edge}$[0] and unit vector $u_{edge}$[n] in the direction of the n$^{th}$ edge, as defined by equation (7) below.

$$\hat{p}_{edge}[n+1] = p_{edge}[0] + (n+1) \cdot ds \cdot u_{edge}[n] \quad (7)$$

wherein ds is a positive constant corresponding to the length of search interval. Once $P_{edge}$[n+1] is estimated, directional intensity gradient dI(t) is calculated in a range of −W/2 to W/2, in the direction of unit vertical vector $n_{edge}$[n] regarding the edge, as defined by equation (8) below.

$$dI(t) = dI(\hat{p}_{edge}[n+1] + t \cdot n_{edge}[n], n_{edge}[n]) \quad (8)$$

where, $t: -\frac{w}{2} \sim \frac{w}{2}$

Assuming that t that maximizes dI(t) is $t_{max}$[n+1], $p_{edge}$[n+1] is calculated as defined by equation (9) below.

$$p_{edge}[n+1] = \hat{p}_{edge}[n+1] + t_{max}[n+1] n_{edge}[n] \quad (9)$$

Consequently, $u_{edge}[n+1]$ is set as a unit vector leading from $p_{edge}[0]$ to $p_{edge}[n+1]$. It is to be noted that the direction perpendicular to the recognized edge, not the direction from the seed point to the camera, is adopted as the reference direction of the directional intensity gradient.

Although the above-mentioned search is repeated a predetermined number of times, it is interrupted if the directional intensity gradient of a new edge is substantially smaller (e.g. less than 70%) than that of the intersection point, as defined by equation (10) below. It is assumed that, if an intersection point is below a threshold $\theta_{edge\,following}$ regarding the number of times or distance of successful edge following, it is not a marking line segment, and is removed.

$$dI(t_{max}[n+1]) < 0.07 \cdot dI(t_{max}[0]) \tag{10}$$

The above-mentioned method is justified based on the intention of recognizing nothing but a guideline, which looks like a relatively long marking line segment, as a marking line segment that has undergone edge following.

Figure 17:
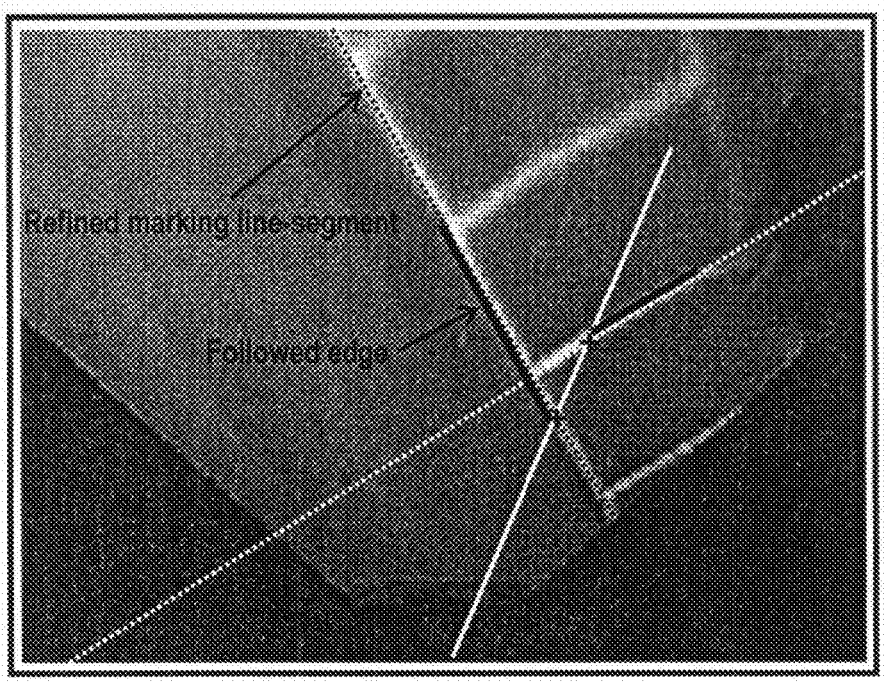
FIG. 17 shows an exemplary result of edge following.

FIG. 17 shows an exemplary result of edge following.

It is clear from FIG. 17 that, as a result of edge following with regard to each intersection point, the direction of the marking line segment is determined as the final estimation.

3.4 Guideline Recognition

Figure 18:
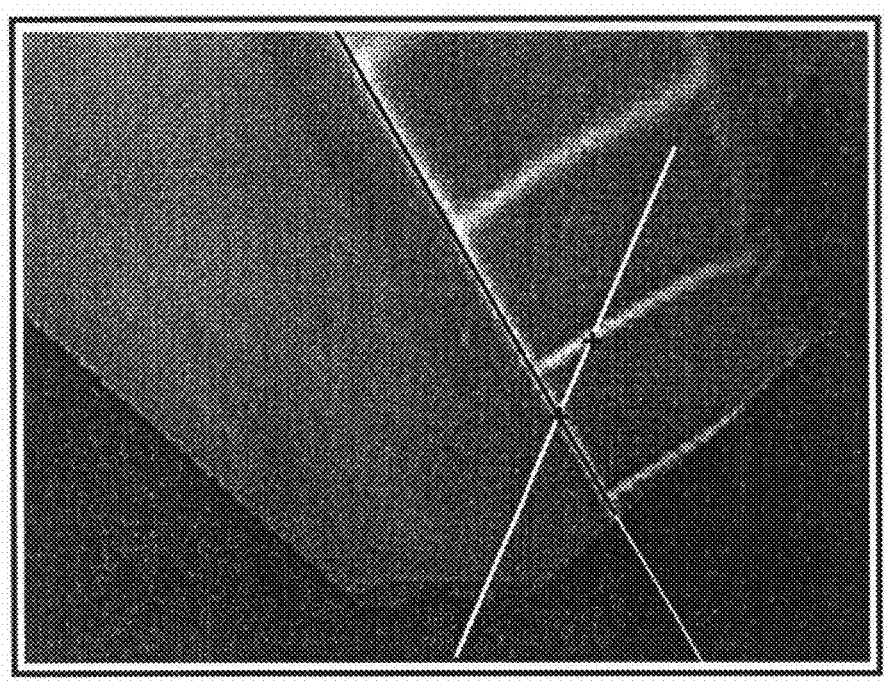
FIG. 18 shows an exemplary result of recognizing a guideline from detected marking line segments.

FIG. 18 shows an exemplary result of recognizing a guideline from detected marking line segments.

The guideline is recognized based on the fact that, among marking line segments intersecting with a specific viewing direction, one close to the camera is the guideline. If the seed point designated by the driver exists within an effective parking slot, the line extending from the seed point to the camera intersects with at least one marking line segment. Considering that the guideline is a marking line segment separating parking slots from the road, it is quite obvious that the guideline is closest to the camera in the direction from the seed point to the camera. In other words, among intersection points corresponding to marking line segments confirmed to be effective after edge following, one having the smallest distance from the camera, i.e. $|p_{camera} - p_{edge}[0]|$, corresponds to the guideline, as shown in FIG. 18.

4. Target Parking Slot Recognition

Separating line segments are recognized in the direction of the guideline based on a point obtained by projecting the seed point onto the guideline, so that the target parking slot designated by the driver is accurately located.

Figure 19:
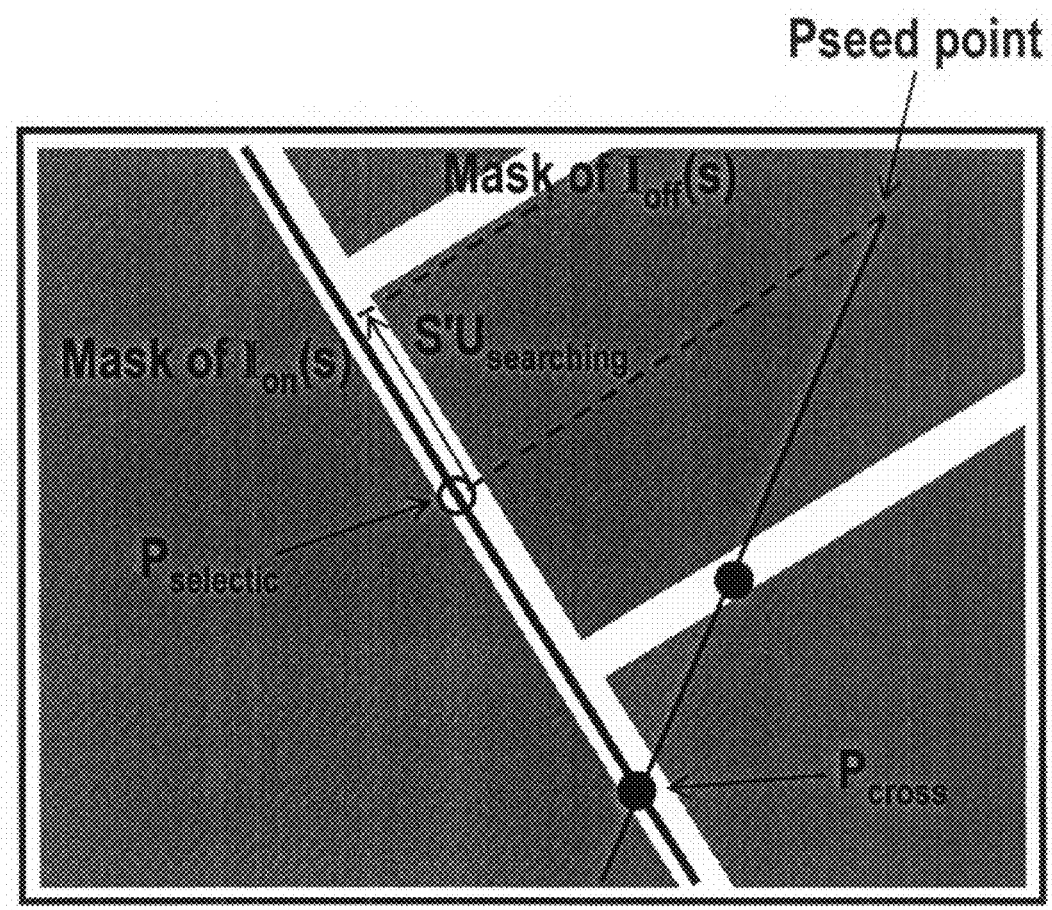
FIG. 19 shows an exemplary process for searching for $I_{on}(s)$ and $I_{off}(s)$.

FIG. 19 shows an exemplary process for searching for $I_{on}(s)$ and $I_{off}(s)$.

Point $p_{selection}$ obtained by projecting seed point $p_{seed\,point}$ onto the guideline is defined in terms of intersection point $p_{cross}$ and unit vector $u_{guideline}$ in the direction of the guideline, as defined by equation (11) below.

$$p_{selection} = p_{cross} + (u_{guideline} \cdot (p_{seed\,point} - p_{cross})) u_{guideline} \tag{11}$$

The search starts from $p_{selection}$ in both directions of $u_{guideline}$, and T-shaped template matching is conducted to recognize a separating line segment. The average intensity $I_{on}(s)$ of a region on the guideline and the average intensity $I_{off}(s)$ of a region outside the guideline, which is far from the camera, are defined by equations (12) and (13) below, respectively. In the equations, $u_{searching}$ is $u_{guideline}$ or $-u_{guideline}$, and $n_{guideline}$ is a unit vector facing away from the camera in a direction perpendicular to $u_{guideline}$.

$$I_{on}(s) = \frac{1}{W} \sum_{t=0}^{\frac{W}{2}} I(p_{cross} + s \cdot u_{searching} + t \cdot n_{guideline}) \tag{12}$$

$$I_{off}(s) = \frac{1}{\frac{W}{2}} \sum_{t=\frac{1}{2}W}^{2W} I(p_{cross} + s \cdot u_{searching} + t \cdot n_{guideline}) \tag{13}$$

FIG. 20 shows an exemplary result of calculating $I_{on}(s)$ and $I_{off}(s)$ in both directions from $P_{selection}$.

Figure 20A:
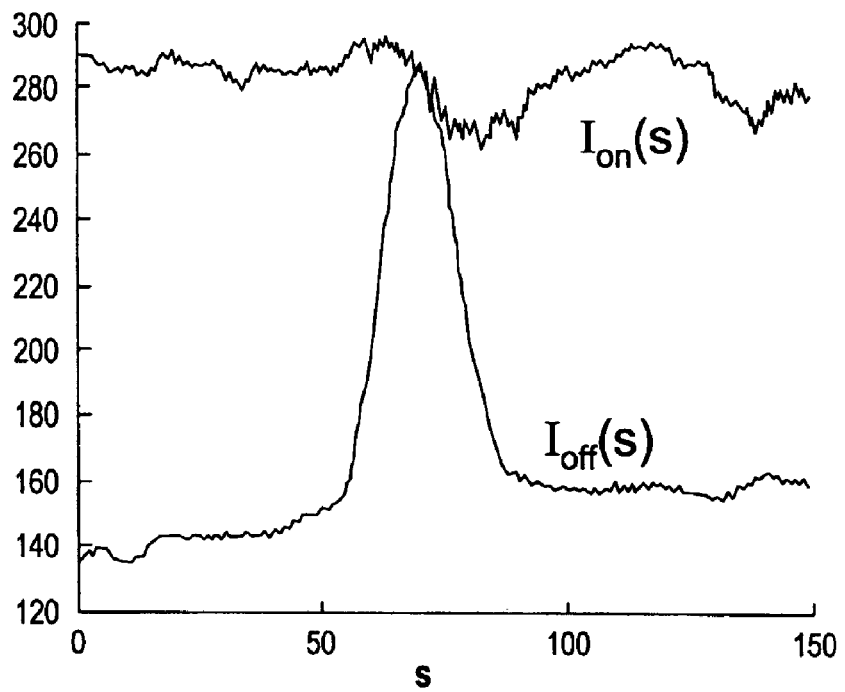
FIG. 20 shows an exemplary result of calculating $I_{on}(s)$ and $I_{off}(s)$ in both directions from $P_{selection}$.
Figure 20B:
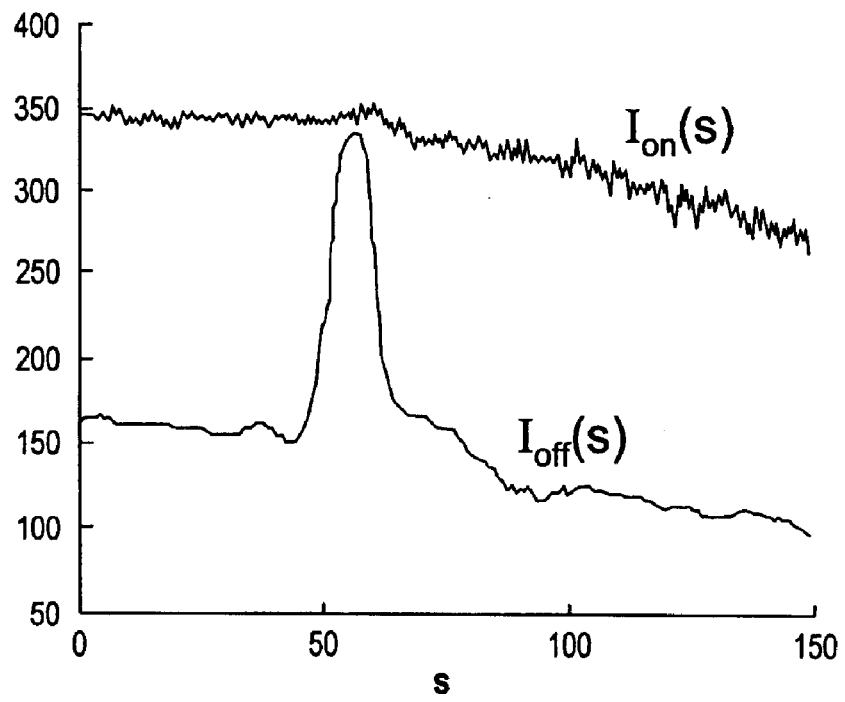

Particularly, FIG. 20A shows the result of the search in the direction of $-u_{Guideline}$, and FIG. 20B shows the result of search in the direction of $u_{Guideline}$. It is clear from FIG. 20 that $I_{on}(s)$ and $I_{off}(s)$ are similar to each other at the T-shaped junction between the guideline and the separating line segment, and $I_{off}(s)$ is much smaller than $I_{on}(s)$ in other regions. Therefore, $L_{separating}(s)$ has the possibility of finding a separating line segment, and is defined by equation (14) below. The first section larger than an arbitrary threshold $\theta_{separating}$ is recognized as a separating line segment.

$$L_{separating}(s) = \frac{I_{off}(s)}{I_{on}(s)} \tag{14}$$

FIG. 21 shows an exemplary result of searching for $L_{separating}(s)$ in both directions from $P_{selection}$.

Figure 21A:
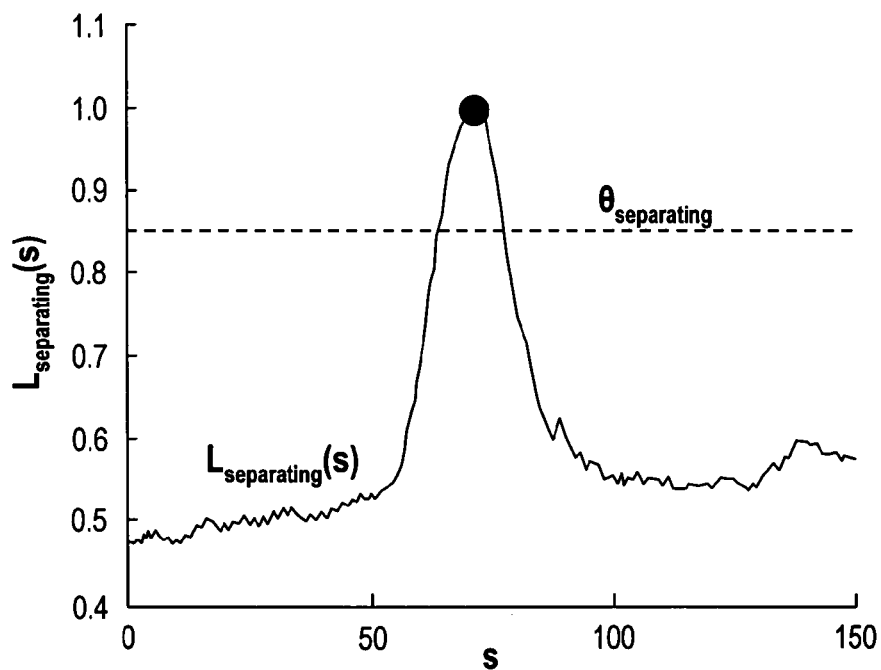
FIG. 21 shows an exemplary result of searching for $L_{separating}(s)$ in both directions from $P_{selection}$.
Figure 21B:
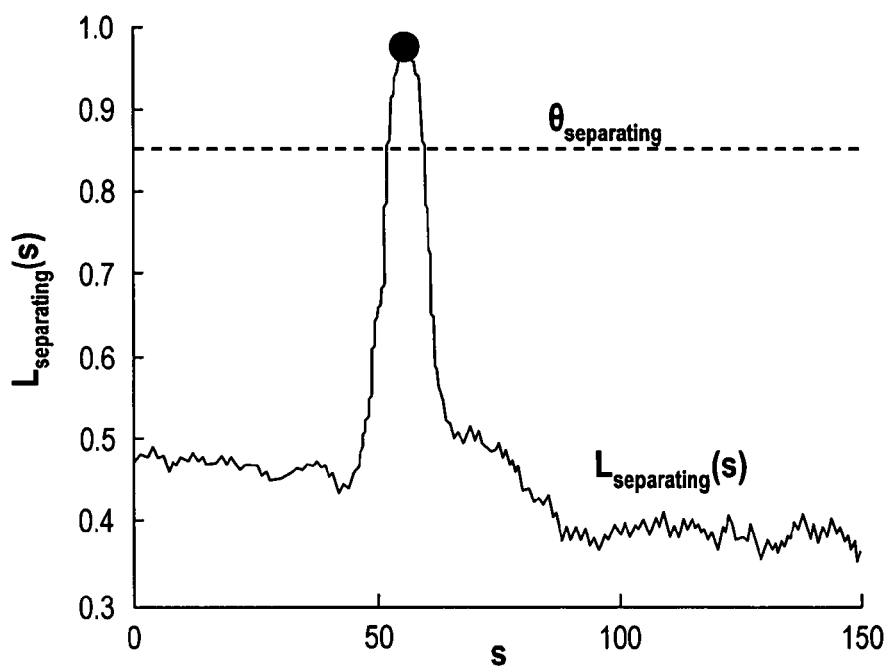

Particularly, FIG. 21A shows the result of the search in the direction of $-u_{Guideline}$, and FIG. 21B shows the result of the search in the direction of $u_{Guideline}$. The search of $L_{separating}(s)$ in both direction, i.e. in the direction of $-u_{Guideline}$, and $u_{Guideline}$, from $P_{selection}$ based on equation (14) provides $L_{separating}(s)$, as shown in FIG. 21.

Figure 22:
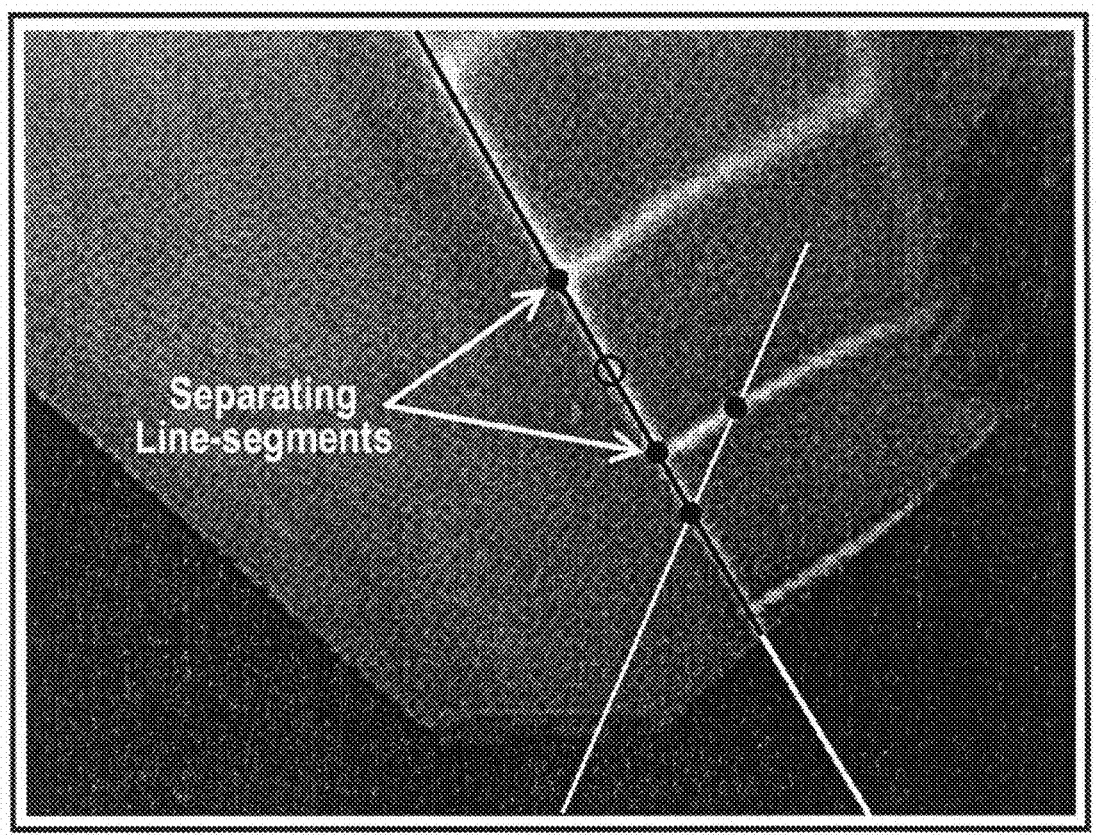
FIG. 22 shows an exemplary result of recognizing separating line segments.

FIG. 22 shows an exemplary result of recognizing separating line segments.

Particularly, FIG. 22 shows the location of separating line segments, which have been recognized through the above-mentioned process, marked on the guideline. The fact that separating line segments are recognized based on the ratio of $I_{on}(s)$ and $I_{off}(s)$ makes is possible to compensate for the change of lighting, which depends on the distance from the camera.

Figure 23:
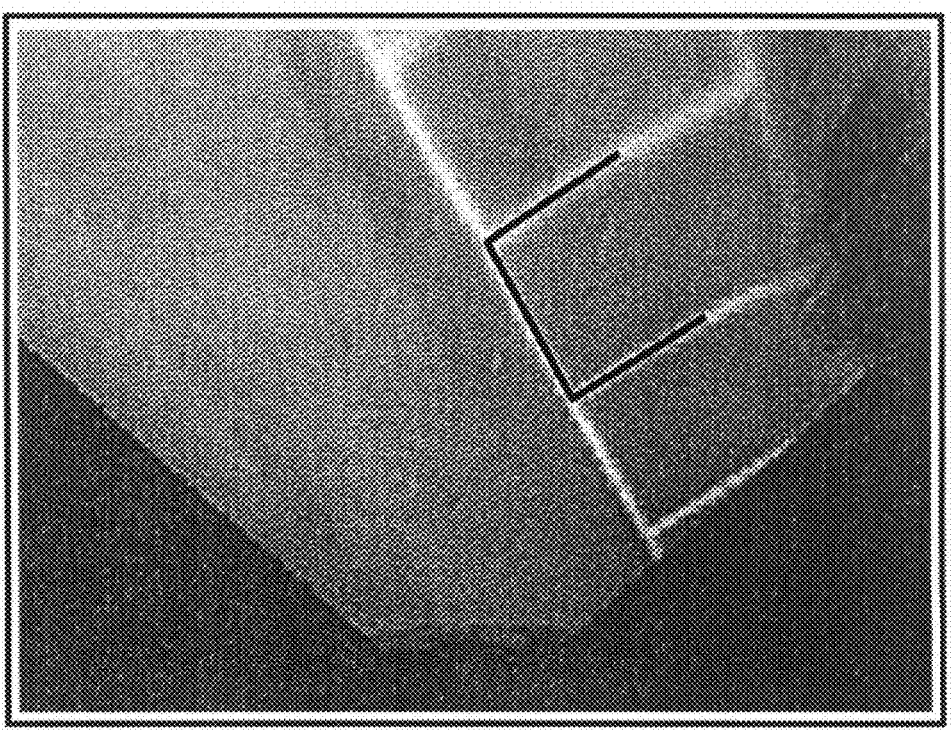
FIG. 23 shows an example of a recognized parking slot on a bird's-eye view.

FIG. 23 shows an example of a recognized parking slot on a bird's-eye view.

Particularly, FIG. 23 shows the result of identifying a parking slot based on the location of separating line segments on the guideline, which have been recognized through the above-mentioned process, together with the direction of $n_{guideline}$ and showing the parking slot on a bird's-eye view.

Figure 24:
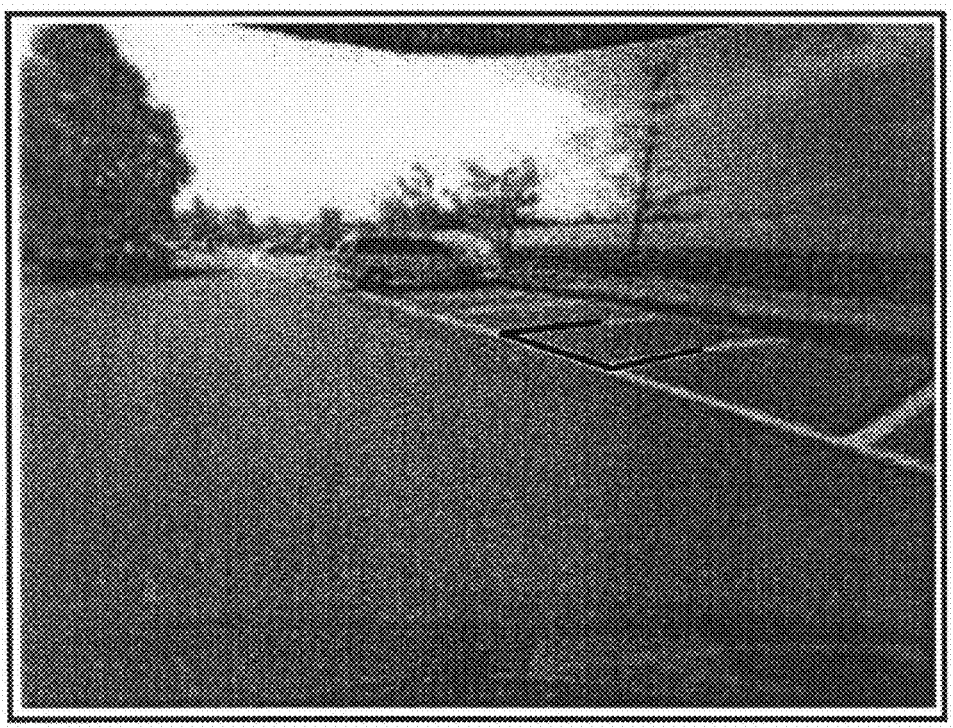
FIG. 24 shows an example of a recognized parking slot on a distortion-corrected image.

FIG. 24 shows an example of a recognized parking slot on a distortion-corrected image.

Particularly, FIG. 24 shows the parking slot on a bird's-eye view, which has been given in FIG. 23, with regard to a distortion-corrected image. It is clear from FIG. 24 that the parking slot, which has been designated by the driver as a seed point, has been successfully recognized.

5. Experimental Results

According to one embodiment of the present invention, a parking slot can be successfully recognized even if other vehicles are parked nearby and even if the light condition varies.

FIG. 25 shows an example of mounting experiment equipment.

Figure 25A:
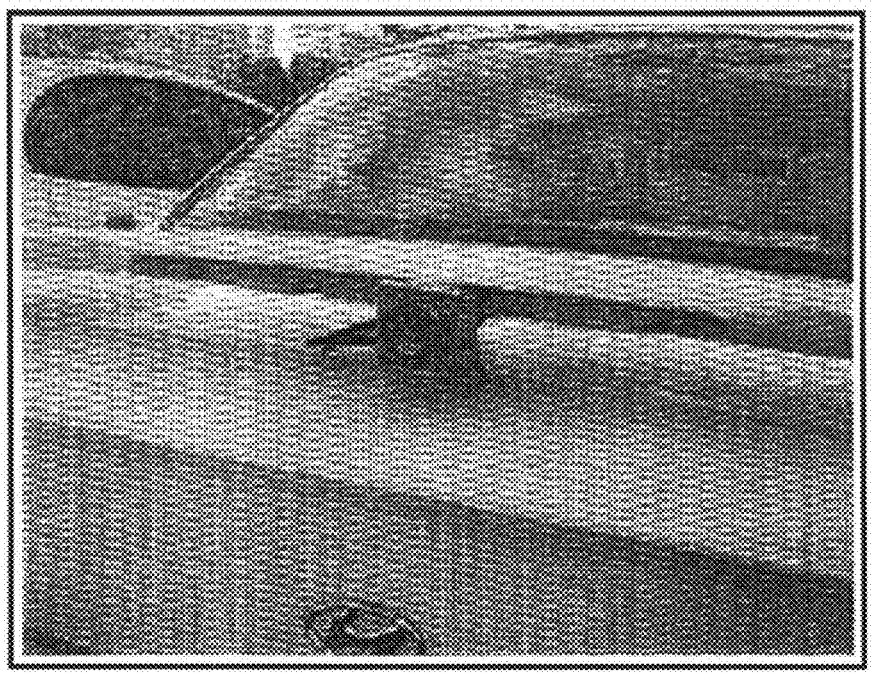
FIG. 25 shows an example of mounting experiment equipment.
Figure 25B:
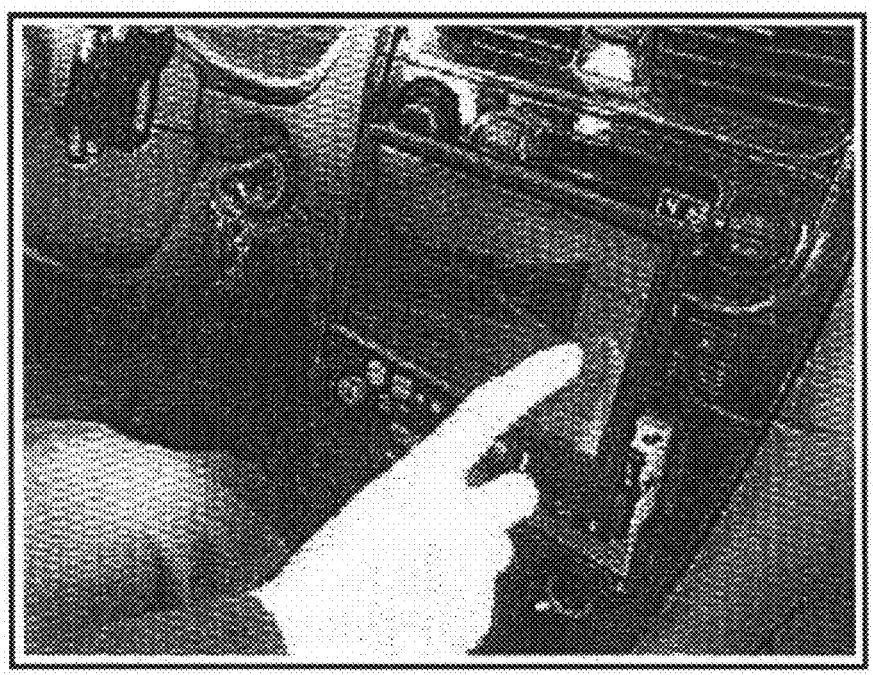

Particularly, FIG. 25A shows a camera mounted on the tail of a vehicle, and FIG. 25B shows a touch screen mounted inside the vehicle. The camera takes a picture of a parking space, which is outputted on the touch screen as an input image. The driver then operates the touch screen to select a seed point.

FIG. 26 shows an exemplary process for recognizing a parking slot when an adjacent parking slot is occupied by a vehicle.

An object on the ground in a bird's-eye view appears as if it spreads out from the camera. Based on this fact, one embodiment of the present invention can successfully recognize intersection points necessary for recognition, i.e. marking line segments and separating line segments, as long as a T-shaped junction between a guideline and a parking slot is noticeable.

Figure 26A:
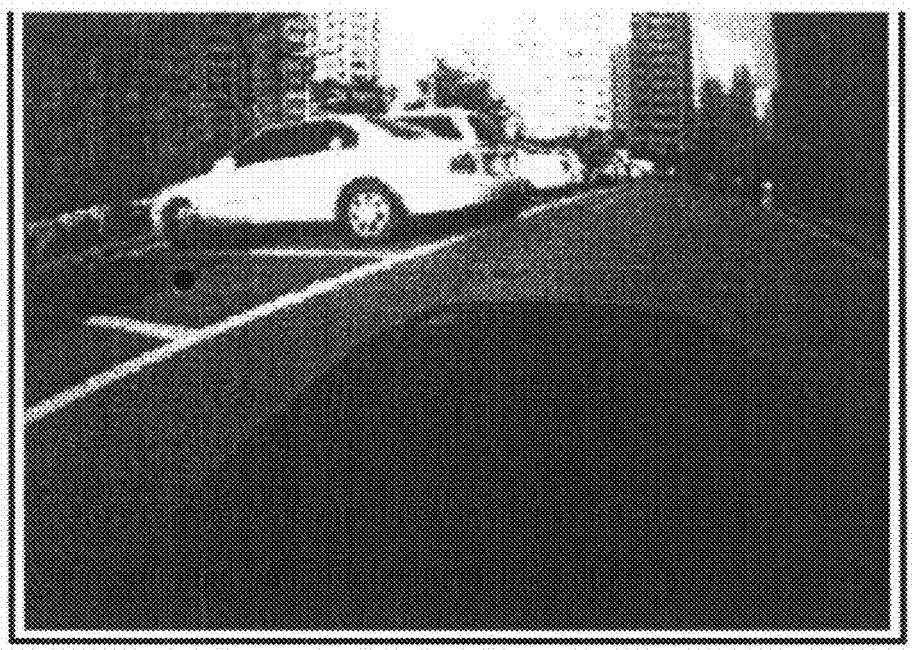
FIG. 26 shows an exemplary process for recognizing a parking slot when an adjacent parking slot is occupied by a vehicle.
Figure 26B:
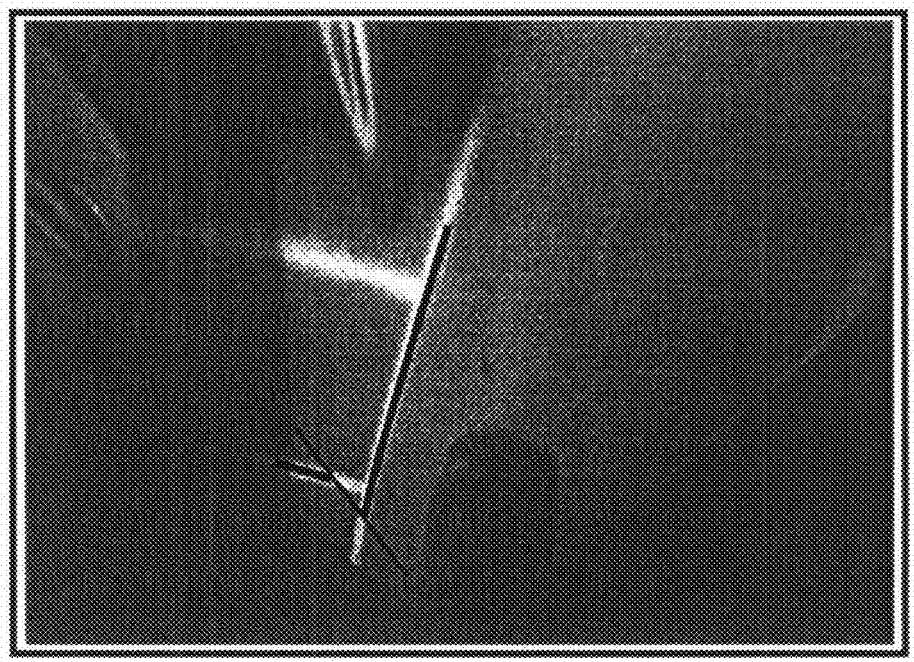
Figure 26C:
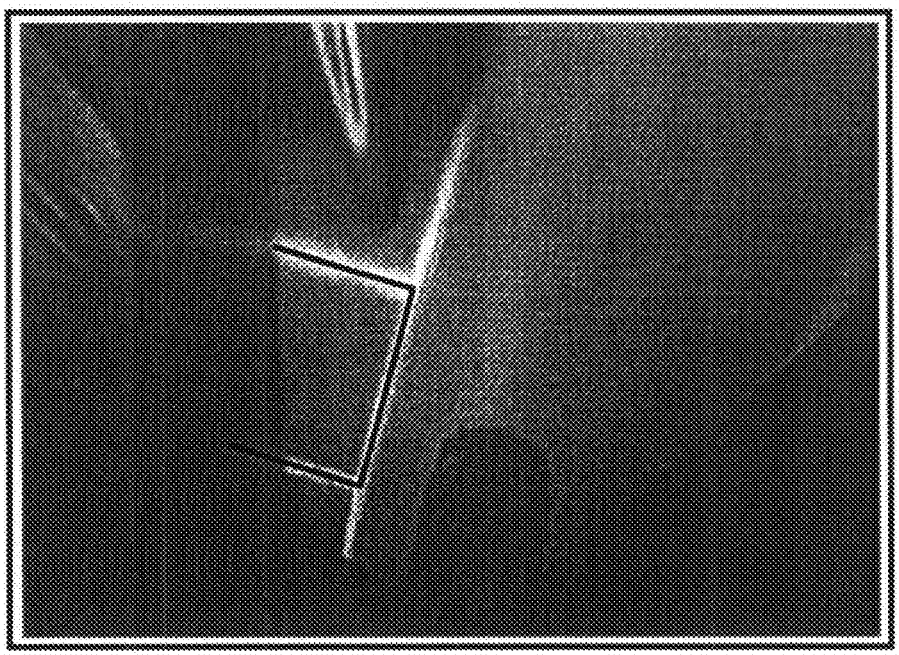
Figure 26D:
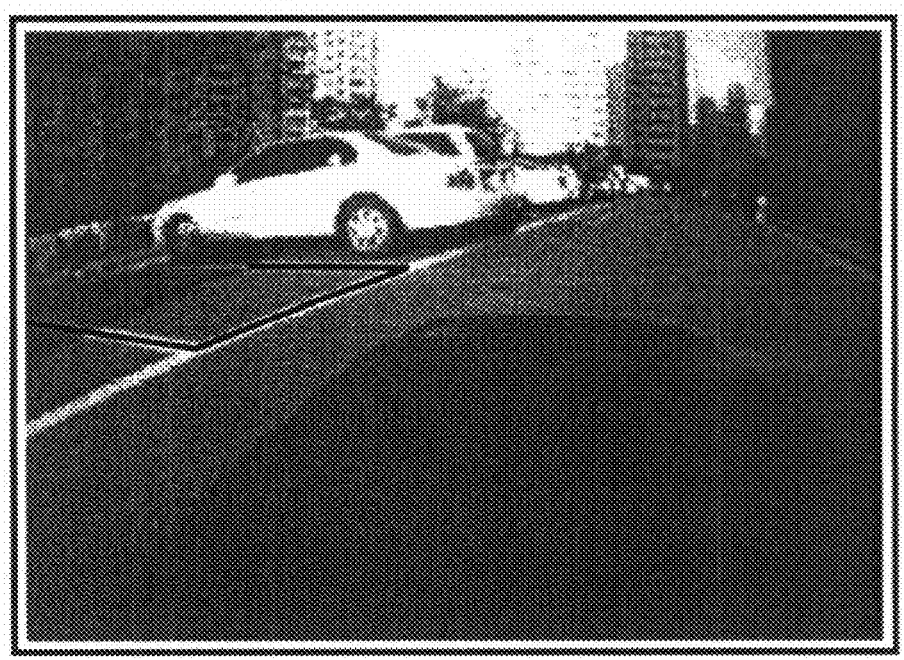

FIG. 26A shows a case in which the contrast of intensity is sharp, the shadow is dark, and an adjacent parking slot is occupied by a vehicle. FIG. 26B shows the result of detecting intersection points and marking line segments. It is clear from FIG. 26B that intersection points and marking line segments can be successfully detected even if the intensity contrast is sharp, the shadow is dark, and an adjacent parking slot is occupied by a vehicle. FIG. 26C shows a parking slot recognized on a bird's-eye view. FIG. 26D shows a distortion-corrected image of a parking slot that has been recognized on a bird's-eye view.

FIG. 27 shows an exemplary process for recognizing a parking slot in the backlight when parking slots on both sides are occupied by vehicles.

It is clear from FIG. 27 that one embodiment of the present invention, which takes advantage of a directional intensity gradient based on consideration of the width of marking line segments, is robust against noise on marking line segments and changes of lighting condition.

Figure 27A:
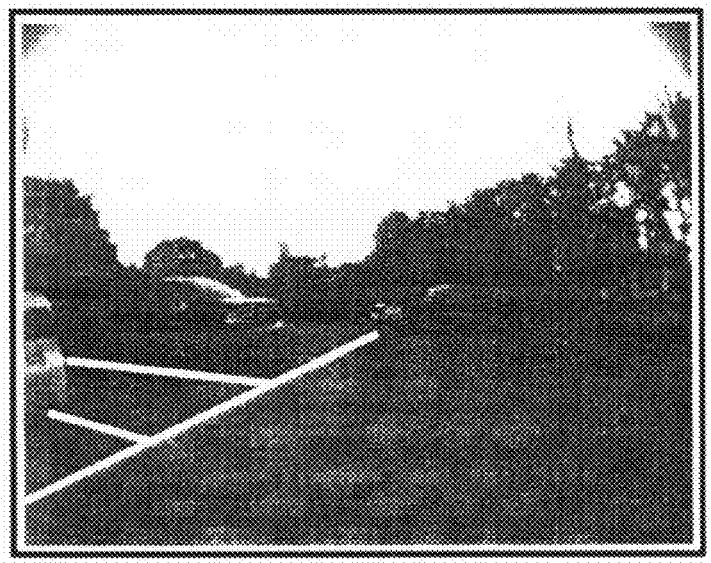
FIG. 27 shows an exemplary process for recognizing a parking slot in the backlight when parking slots on both sides are occupied by vehicles.
Figure 27B:
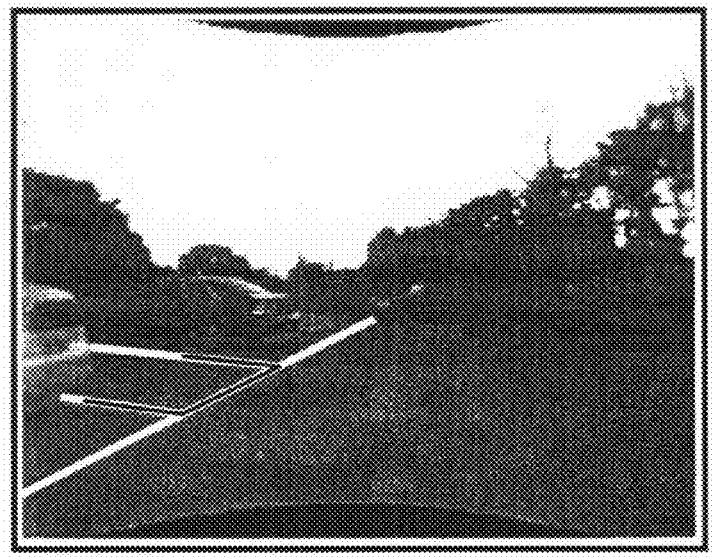
Figure 27C:
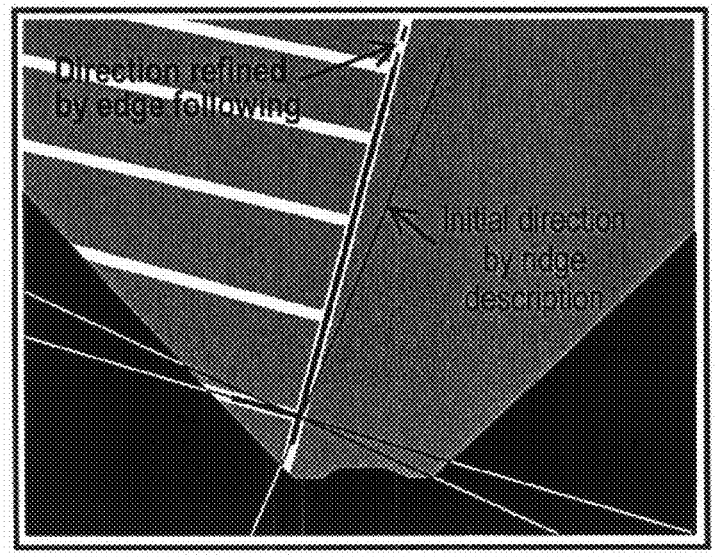

FIG. 27A shows an input image and a seed point in the case of backlight and when parking slots on both sides are occupied by vehicles. FIG. 27B provides a distortion-corrected image showing the result of recognizing a parking slot in the backlight when parking slots on both sides are occupied by vehicles. FIG. 27C shows accurate detection of the direction of a marking line segment as a result of edge following. It is clear from FIG. 27C that errors in the initial direction of intersection points resulting from old marking line segments have been overcome by edge following and that the direction of a marking line segment is accurately detected.

FIG. 28 shows an exemplary process for recognizing a parking slot when the intensity varies greatly among parts of an image.

According to one embodiment of the present invention, separating line segments are detected based on consideration of the locally varying intensity. This means that separating line segments can be successfully detected even if the intensity greatly varies at each location. FIG. 28A shows a case in which the intensity, greatly varies among respective portions of an input image. FIG. 28B shows the result of recognizing a parking slot when the intensity greatly varies among respective portions of an input image. FIG. 28C shows that $I_{on}(s)$ and $I_{off}(s)$ greatly vary depending on s. FIG. 28D shows that $L_{separating}(s)$ compensates for such variation and successfully detects separating line segments.

In summary, the present invention proposes a method for recognizing a parking slot based on a seed point, which has been designated by the driver as a target parking location with reference to an image of a parking space displayed on the screen inside the vehicle. To this end, the present invention relies on a directional intensity gradient, points of intersection between a line extending from the seed point to a camera and marking line segments, the initial direction of intersection points, edge following, etc. It can be said that advanced use of information regarding the width of marking line segments on a bird's-eye view provides an effect similar to that of a band pass filter on the intensity profile. In addition, by detecting the intensity gradient directionally with regard to the direction from the seed point to the camera, information regarding the direction of marking line segments can be advantageously used in advance. The most characteristic feature of the present invention lies in the fact that, since parked vehicles are projected in a direction away from the camera in the bird's-eye view of a parking lot, an intersection point close to the camera can be easily recognized as a guideline as long as the guideline and a T-shaped intersection point are noticeable.

As mentioned above, the present invention has the following advantages.

Based on a seed point designated by the driver, a parking slot can be recognized accurately and quickly.

By recognizing a marking line segment based on a directional intensity gradient, the marking line segment is detected accurately regardless of noise and the varying lighting condition.

The directional intensity gradient is defined so that average intensity corresponding to a length of W/2 is used. This guarantees that the edge of a marking line segment can be detected stably without being affected by noise.

The direction of a ridge is estimated based on consideration that the directional intensity gradient near an intersection point constitutes a ridge along an edge. The resulting estimation of the direction of the edge guarantees accurate estimation of the direction of the marking line segment.

Edge following is conducted based on the point of intersection between a line segment extending from a seed point to a camera and a marking line segment, as well as the initial edge direction. This refines the direction of the marking line segment and improves the reliability of estimation.

Among marking line segments intersecting with the direction of view from the camera to the seed point, one closest to the camera is recognized as a guideline. Consequently, the guideline, which plays the most critical role in recognizing a parking slot, can be recognized accurately and quickly.

The seed point is projected onto the guideline, and the projected point is used as a basis for recognizing a separating line segment in the direction of the guideline. This guarantees accurate recognition of the parking slot designated by the driver.

The present invention can accurately recognize a parking slot regardless of noise and the varying lighting condition, even if there is a nearby obstacle (e.g. another vehicle), if the parking space has been photographed in the backlight, or if the intensity greatly varies in the vicinity.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for recognizing a parking slot by using a bird's-eye view, the apparatus comprising:
   a camera for photographing a parking space at a vehicle and creating and transferring an input image;
   a user interface unit for receiving an input of a seed point as a desired parking location in the parking space from a driver and transferring the seed point; and a parking slot recognition unit for receiving the input image from the camera and the seed point from the user interface unit, converting the input image into the bird's-eye view, estimating a number of marking line segments and a direction of the marking line segments by using a directional intensity gradient regarding a distance on the bird's-eye view, recognizing the marking line segment closer to the camera as a guideline among at least one marking line segment intersecting with a direction of view from the camera to the seed point, and recognizing a number of separating line segments in a direction of the guideline so as to recognize the guideline and the separating line segments as the parking slot.

2. The apparatus as claimed in claim 1, wherein the parking slot recognition unit is adapted to measure the directional intensity gradient on the line segment joining the seed point and the camera on the bird's-eye view and to detect points as the marking line segments, the points being spaced from the seed point as much as a distance of a positive peak having a directional intensity gradient value above a predetermined threshold.

3. The apparatus as claimed in claim 2, wherein the threshold is obtained by subtracting an average value from a maximum vale of intensity on the line segment joining the seed point and the camera and by dividing a resulting difference by a predetermined integer.

4. The apparatus as claimed in claim 1, wherein the parking slot recognition unit is adapted to measure a directional intensity gradient near intersection points between a line segment joining the seed point and the camera and the marking line segments, to estimate a direction of a ridge constituted by directional intensity gradient values near the intersection points, and to estimate the direction of the ridge as the direction of the marking line segments.

5. The apparatus as claimed in claim 4, wherein the parking slot recognition unit is adapted to select a marking line segment only in the direction of the marking line segments based on the intersection points between the line segment joining the seed point and the camera and the marking line segments and the direction of the marking line segment and to conduct edge following so as to re-estimate the direction of the marking line segments.

6. The apparatus as claimed in claim 1, wherein the parking slot recognition unit is adapted to project the seed point onto the guideline, to search in both directions of a unit vector extending in the direction of the guideline from the projected point, and to conduct T-shaped template matching so that the separating marking line segments are recognized.

7. The apparatus as claimed in claim 6, wherein the parking slot recognition unit is adapted to recognize a first section as the separating line segments, the first section having a ratio of average intensity of a region outside the guideline to intensity of a region inside the guideline, the ratio being larger than a predetermined threshold.

8. A method for recognizing a parking slot based on a bird's-eye view by a parking slot recognition unit connected to a camera and a user interface unit to recognize the parking slot, the camera photographing a parking space at a vehicle and creating and transferring an input image, the user interface unit receiving an input of a seed point from a driver as a desired parking location in the parking space and transferring the seed point, the method comprising the steps of:

(a) receiving the input image and the seed point and converting the input image into the bird's-eye view;

(b) estimating a number of marking line segments and a direction of the marking line segments by using a directional intensity gradient regarding a distance on the bird's-eye view;

(c) recognizing the marking line segment closer to the camera as a guideline among at least one marking line segment intersecting with a direction of view from the camera to the seed point; and (d) recognizing a number of separating line segments in a direction of the guideline so as to recognize the guideline and the separating line segments as the parking slot.

9. The method as claimed in claim 8, wherein step (b) comprises the steps of:

(b1) measuring the directional intensity gradient on the line segment joining the seed point and the camera on the bird's-eye view;

(b2) recognizing points as the marking line segments, the points being spaced from the seed point as much as a distance of a positive peak having the directional intensity gradient value above a predetermined threshold;

(b3) measuring the directional intensity gradient near intersection points between the line segment joining the seed point and the camera and the marking line segments; and (b4) estimating a direction of a ridge constituted by directional intensity gradient values near the intersection points as the direction of the marking line segments.

10. The method as claimed in claim 9, wherein, after step (b4), the method further comprises the steps of:

(b5) selecting the marking line segment only in the direction of the marking line segments based on the intersection points between the line segment joining the seed point and the camera and the marking line segments and the direction of the marking line segments; and (b6) conducting edge following with regard to the selected marking line segment so as to re-estimate the direction of the marking line segments.

11. The method as claimed in claim 8, wherein step (d) comprises a step of (d1) projecting the seed point onto the guideline, searching in both directions of a unit vector extending in the direction of the guideline from the projected point, and conducting T-shaped template matching so that the separating marking line segments are recognized.

12. A system for assisting parking of a vehicle by recognizing a parking slot based on a bird's-eye view, the system comprising:

a parking slot recognition unit having a camera and a user interface unit, the parking slot recognition unit receiving an input image from the camera and a seed point from the user interface unit, converting the input image into the bird's-eye view, estimating a number of marking line segments and a direction of the marking line segments by using a directional intensity gradient regarding a distance on the bird's-eye view, recognizing the marking line segment closer to the camera as a guideline among at least one marking line segment intersecting with a direction of view from the camera to the seed point, recognizing a number of separating line segments in a direction of the guideline so as to recognize the guideline and the separating line segments as the parking slot, and transferring a target parking slot;

a detection unit having a number of sensors for recognizing a driving condition of the vehicle, the detection unit creating and transferring information regarding the driving condition of the vehicle;

a parking assist control unit for estimating a location of the vehicle based on the information regarding the driving condition from the detection unit, receiving the target parking slot so as to create a path plan for parking the vehicle at the parking slot, and creating and transferring a control signal for parking the vehicle at the parking slot based on consideration of the location; and an active steering unit for steering the vehicle according to the control signal after receiving the control signal.

* * * * *